US012072641B2

(12) United States Patent
Imaizumi

(10) Patent No.: US 12,072,641 B2
(45) Date of Patent: Aug. 27, 2024

(54) IMAGE FORMING APPARATUS

(71) Applicant: CANON KABUSHIKI KAISHA, Tokyo (JP)

(72) Inventor: Chikara Imaizumi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/318,255

(22) Filed: May 16, 2023

(65) Prior Publication Data

US 2023/0375955 A1 Nov. 23, 2023

(30) Foreign Application Priority Data

May 19, 2022 (JP) ................................. 2022-082214

(51) Int. Cl.

*G03G 15/16* (2006.01)
*G03G 15/00* (2006.01)
*G03G 15/01* (2006.01)
*G03G 15/02* (2006.01)

(52) U.S. Cl.

CPC ..... *G03G 15/0189* (2013.01); *G03G 15/0136* (2013.01); *G03G 15/0283* (2013.01); *G03G 15/1605* (2013.01); *G03G 15/5008* (2013.01); *G03G 2215/0067* (2013.01)

(58) Field of Classification Search

CPC ........... G03G 15/0189; G03G 15/1605; G03G 15/1615; G03G 15/161

See application file for complete search history.

(56) References Cited

U.S. PATENT DOCUMENTS

2008/0193173 A1* 8/2008 Meguro ............... G03G 15/166 399/302
2013/0136498 A1* 5/2013 Ju ...................... G03G 15/1615 399/121
2015/0309447 A1* 10/2015 Suzuki .............. G03G 15/0136 399/121

(Continued)

FOREIGN PATENT DOCUMENTS

JP S45-026504 Y2 10/1970
JP 2004-287083 A 10/2004
JP 2008-216969 A 9/2008

(Continued)

*Primary Examiner* — Thomas S Giampaolo, II
(74) *Attorney, Agent, or Firm* — Canon U.S.A., Inc. IP Division

(57) ABSTRACT

An image forming apparatus includes an image bearing member, a belt, a contact member, a rotation shaft member, a cam, an opposing member, and a damper. The belt receives a toner image from the image bearing member. The cam rotates in tandem with the rotation shaft member and contacts or separates the contact member and the belt. The opposing member is disposed to face the rotation shaft member in a direction intersecting with a rotation shaft member shaft direction. The damper member has a first flexible portion and a second flexible portion that are elastically deformable by contacting with the opposing member. In either contact operation or separation operation of the contact member to/from the belt, the damper member rotates in tandem with rotation of the rotation shaft member so that both the first flexible portion and the second flexible portion contact with the opposing member and are elastically deformed.

13 Claims, 18 Drawing Sheets

(56) References Cited

U.S. PATENT DOCUMENTS

| | | | | |
|---|---|---|---|---|
| 2016/0216650 | A1* | 7/2016 | Hatano | G03G 15/1615 |
| 2019/0094763 | A1* | 3/2019 | Suzuki | G03G 15/1615 |

FOREIGN PATENT DOCUMENTS

| | | | |
|---|---|---|---|
| JP | 2016-136208 | A | 7/2016 |
| JP | 2022-013692 | A | 1/2022 |
| JP | 2022-063012 | A | 4/2022 |

* cited by examiner

IMAGE FORMING APPARATUS

BACKGROUND

Field

The present disclosure relates to an image forming apparatus that performs contact/separation operation for a transfer member.

Description of the Related Art

As an image forming apparatus that outputs color images, a tandem-type image forming apparatus has been known, where a plurality of image bearing members, for carrying an image on a respective surface, are disposed in a line along the moving direction of an outer periphery surface of an intermediate transfer belt.

In the tandem-type image forming apparatus, the intermediate transfer belt is held between photosensitive drums (image bearing members) and transfer rollers which are disposed corresponding to each photosensitive drum, and a toner image formed on each photosensitive drum is transferred onto the intermediate transfer belt. An intermediate transfer unit that performs primary transfer of a toner image like this normally includes a contact/separation mechanism to separate the transfer rollers from the intermediate transfer roller when an image is not formed, so as to prevent permanent deformation of the intermediate transfer belt and to reduce wear of the photosensitive drums.

In the contact/separation mechanism that supports a transfer member (e.g. transfer rollers), a collision sound among members may increase due to a compression spring and the like that energizes each member. Japanese Patent Application Publication No. 2008-216969 discloses a configuration to contact an elastic member with an outer peripheral surface of an eccentric cam which is disposed in the contact/separation mechanism, in order to decrease the collision sound generated during the contact/separation operation of the transfer member (e.g. transfer roller).

SUMMARY

The present disclosure provides a technique to improve the collision sound reducing performance when the transfer member performs contact/separation operation.

According to an aspect of the present disclosure, an image forming apparatus includes an image bearing member configured to carry a toner image, a belt that is endless and onto which the toner image carried on the image bearing member is to be transferred, a contact member that is disposed to be contactable with/separable from the belt, a rotation shaft member, a cam configured to rotate in tandem with the rotation shaft member and to contact or separate the contact member with/from the belt, an opposing member that is disposed to face the rotation shaft member in a direction intersecting with a shaft direction of the rotation shaft member, and a damper member that includes a first flexible portion and a second flexible portion that are elastically deformable by contacting with the opposing member, wherein, in either contact operation or separation operation of the contact member to/from the belt, the damper member rotates in tandem with rotation of the rotation shaft member so that both the first flexible portion and the second flexible portion contact with the opposing member and are elastically deformed.

Further features of the present disclosure will become apparent from the following description of exemplary embodiments with reference to the attached drawings.

DESCRIPTION OF THE EMBODIMENTS

Hereinafter, a description will be given, with reference to the drawings, of embodiments (examples) of the present disclosure. However, the sizes, materials, shapes, their relative arrangements, or the like of constituents described in the embodiments may be appropriately changed according to the configurations, various conditions, or the like of apparatuses to which the disclosure is applied. Therefore, the sizes, materials, shapes, their relative arrangements, or the like of the constituents described in the embodiments do not intend to limit the scope of the disclosure to the following embodiments.

Embodiment 1

Printer P

Figure 1:
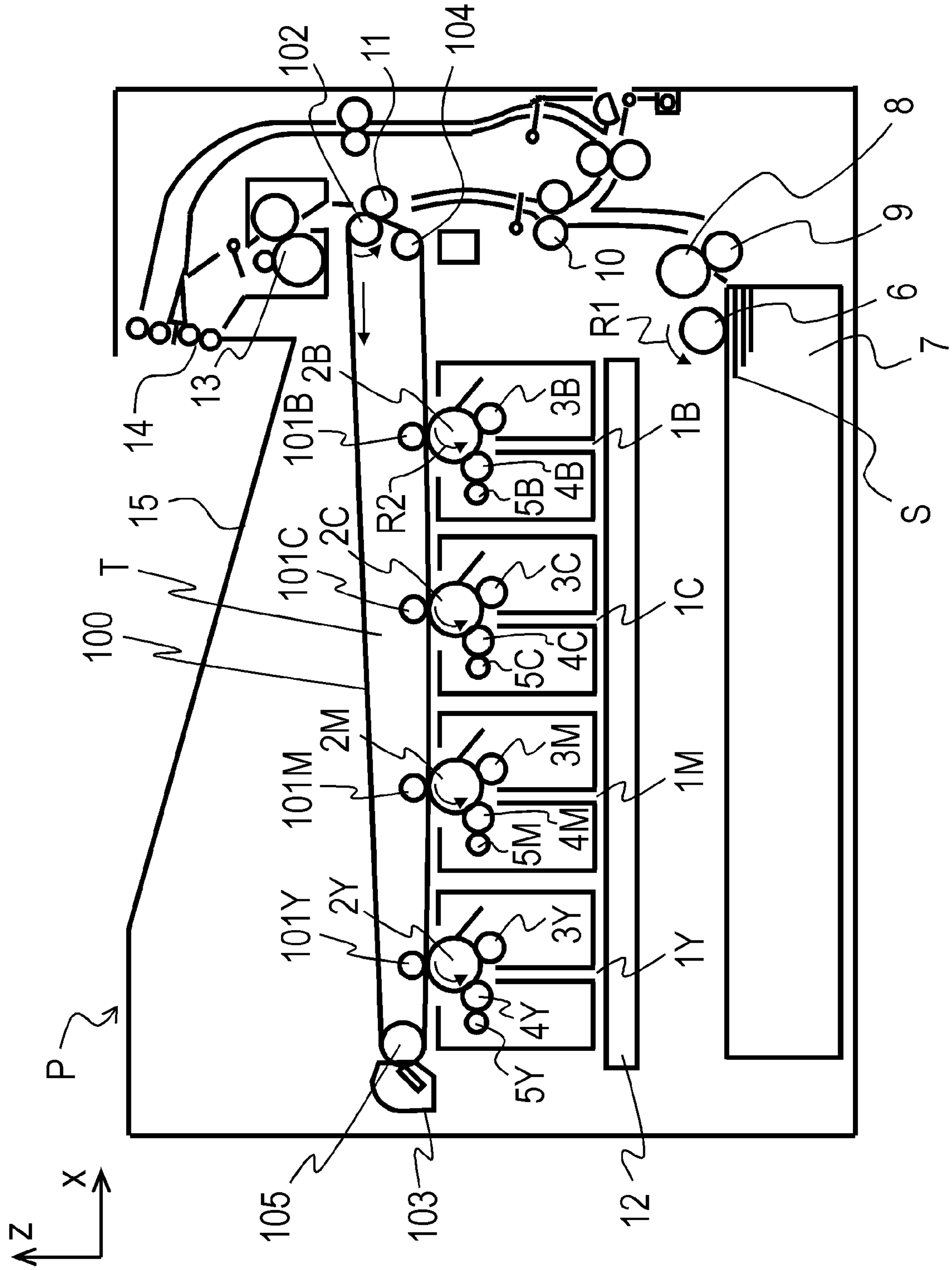
FIG. 1 is a cross-sectional view of a printer according to Embodiment 1.

A general configuration of a full color image forming apparatus according to Embodiment 1 will be described first with reference to FIG. 1. The image forming apparatus of Embodiment 1 is a full color laser beam printer P (hereafter "Printer P") which includes image forming portions to form four-color (yellow Y, magenta M, cyan C and black B) toner images respectively. FIG. 1 is a schematic cross-sectional view depicting a general configuration of the printer P. In the following, each element will be described in general, omitting a Y, M, C and B suffix attached to a reference number to indicate the color the element is used for, unless color distinction is necessary.

The printer P is a tandem-type full color image forming apparatus that forms an image using four colors of toner. The printer P is used by selecting one of three operation modes: a full separation mode in which an image is not formed; a monochrome mode in which an image can be formed using only the toner of black B; and a full color mode in which an image can be formed using four colors of toner.

As illustrated in FIG. 1, the printer P includes four cartridges 1 (1Y, 1M, 1C, 1B) which are disposed side by side in the horizontal direction. The cartridge 1 integrally includes a photosensitive drum 2 (2Y, 2M, 2C, 2B), a charging roller 3 (3Y, 3M, 3C, 3B) which is disposed around the photosensitive drum 2, and a developing roller 4 (4Y, 4M, 4C, 4B). The charging roller 3 uniformly charges the photosensitive drum 2, and the developing roller 4 develops a toner image by adhering toner to the photosensitive drum 2. A predetermined color of toner (not illustrated) is stored in the cartridge 1, and is supplied to the surface of the developing roller 4 by the rotation of a supply roller 5 (5Y, 5M, 5C, 5B). In the description on Embodiment 1, it is defined that the axis direction of the photosensitive drum 2 is the y axis direction, the center of gravity direction is the z axis direction, and the direction perpendicular to the y axis direction and the z axis direction is the x axis direction respectively.

The operation to form an image on a recording material S will be described next. The printer P rotates a pickup roller 6 in an arrow R1 direction indicated in FIG. 1, in a state where the pickup roller 6 is in contact with the recording material S stored in a cassette 7, and feeds the recording material S to a paper feeding roller 8 and a separation roller 9. Then the recording material S is separated one by one by a separation roller 9, and is transported to a registration roller 10.

Synchronizing with the operation of forming a toner image which is transferred onto the surface of a belt 100 of the intermediate transfer unit T, the recording material S is transported to a space between a secondary transfer roller 11, which is in contact with the surface of the belt 100, and the belt 100, by the registration roller 10. The configuration of the intermediate transfer unit T will be described in detail later.

On the other hand, synchronizing with the operation of feeding the recording material S, the surface of the photosensitive drum 2 is uniformly charged by the charging roller 3, while rotating in the arrow R2 direction indicated in FIG. 1. Further, while rotating, the photosensitive drum 2 is exposed by a laser scanner 12, which emits light in accordance with an image signal, and thereby an electrostatic latent image is formed on the surface of the photosensitive drum 2.

The electrostatic latent image on the surface of the photosensitive drum 2 is developed by the developing roller 4 and visualized as a toner image. At a position facing the photosensitive drum 2 via the belt 100, a primary transfer roller 101 (101Y, 101M, 101C and 101B) that can rotate as a contact member, which is in contact with the belt 100, is disposed. The shaft direction of the primary transfer roller 101 is in parallel with the shaft direction (y direction) of the photosensitive drum 2. By the primary transfer roller 101 that is energized in the direction to the photosensitive drum 2, the photosensitive drum 2 and the belt 100 contact with each other, and the toner image on the surface of the photosensitive drum 2 is sequentially multi-transferred to the belt 100 by each primary transfer roller 101.

Then the toner image multi-developed on the belt 100 is moved with the belt 100 to the secondary transfer roller 11 by a belt driving roller 102, and is secondarily transferred onto the recording material S. The toner image transferred onto the recording material S is transported to a fixing roller pair 13 (toner fixing means), and while passing through a nip portion formed by the fixing roller pair 13, the toner image is head, pressed and fixed to the recording material S. Then the recording material S is discharged via a discharging roller pair 14 into a delivery dray 15 located on the upper part of the printer P, with the toner image surface face down, and thereby the image forming operation ends.

Intermediate Transfer Unit T

Figure 2:
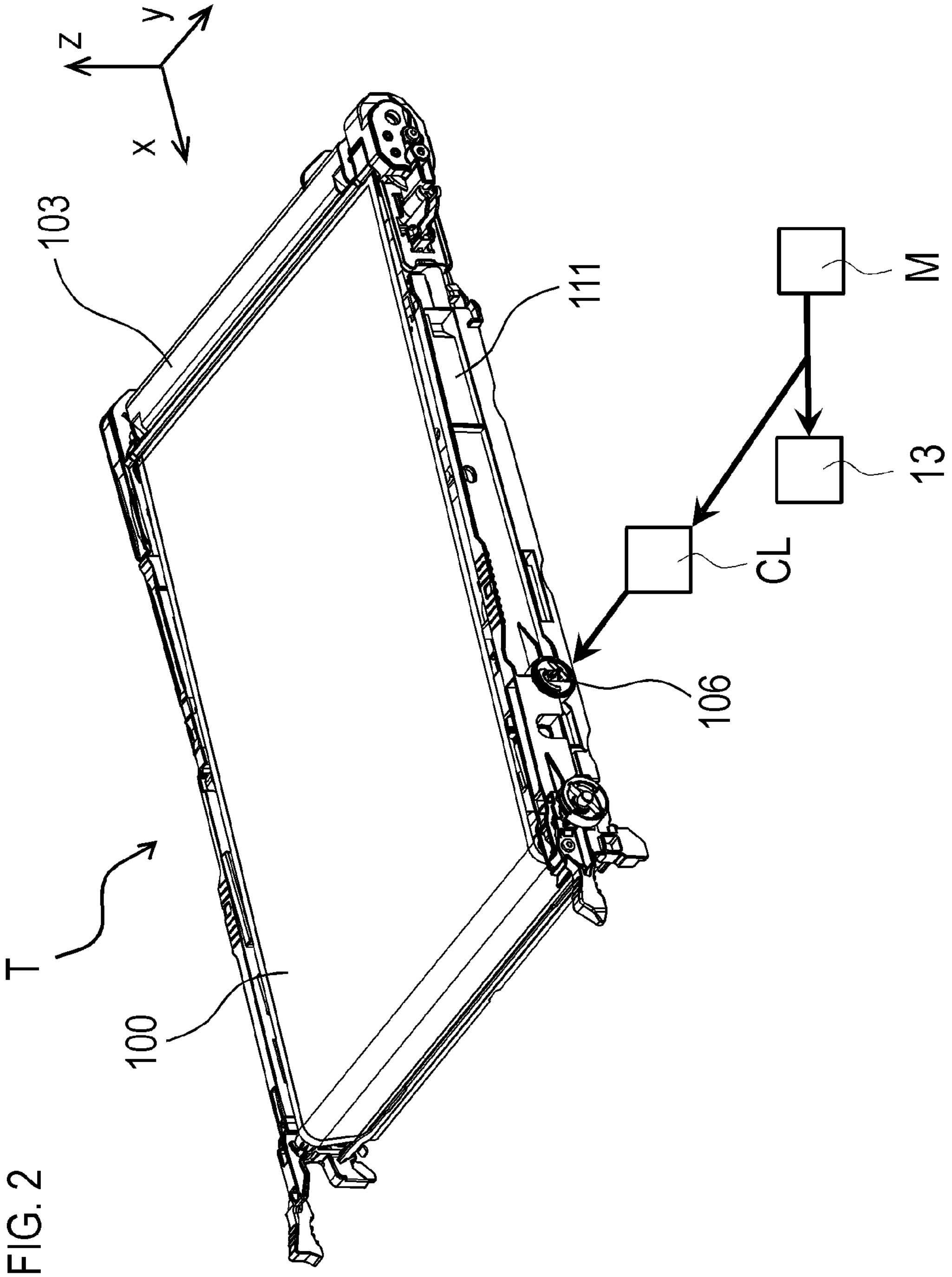
FIG. 2 is a perspective view of an intermediate transfer unit according to Embodiment 1.
Figure 3:
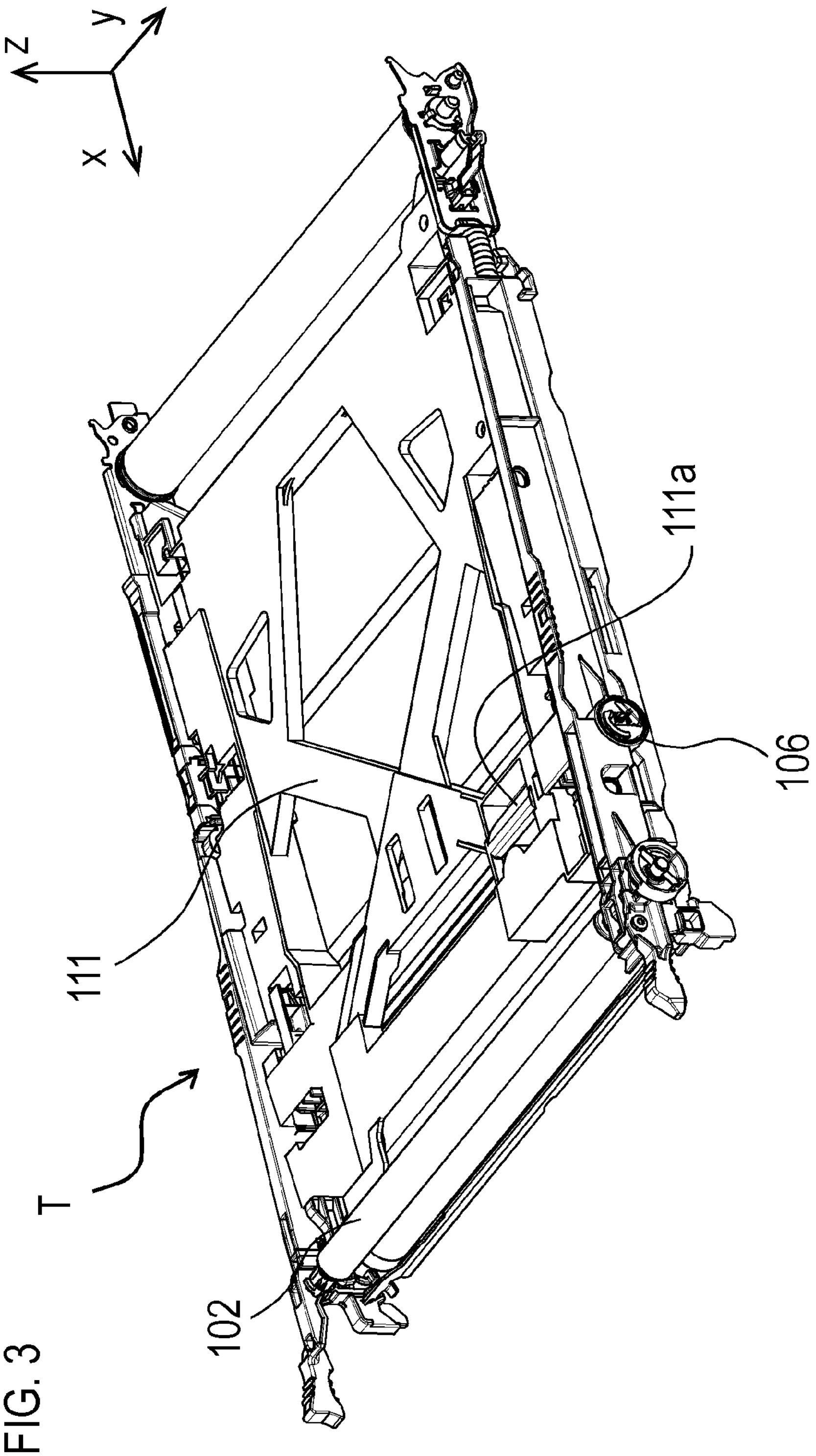
FIG. 3 is a perspective view depicting an internal configuration of the intermediate transfer unit according to Embodiment 1.
Figure 4:
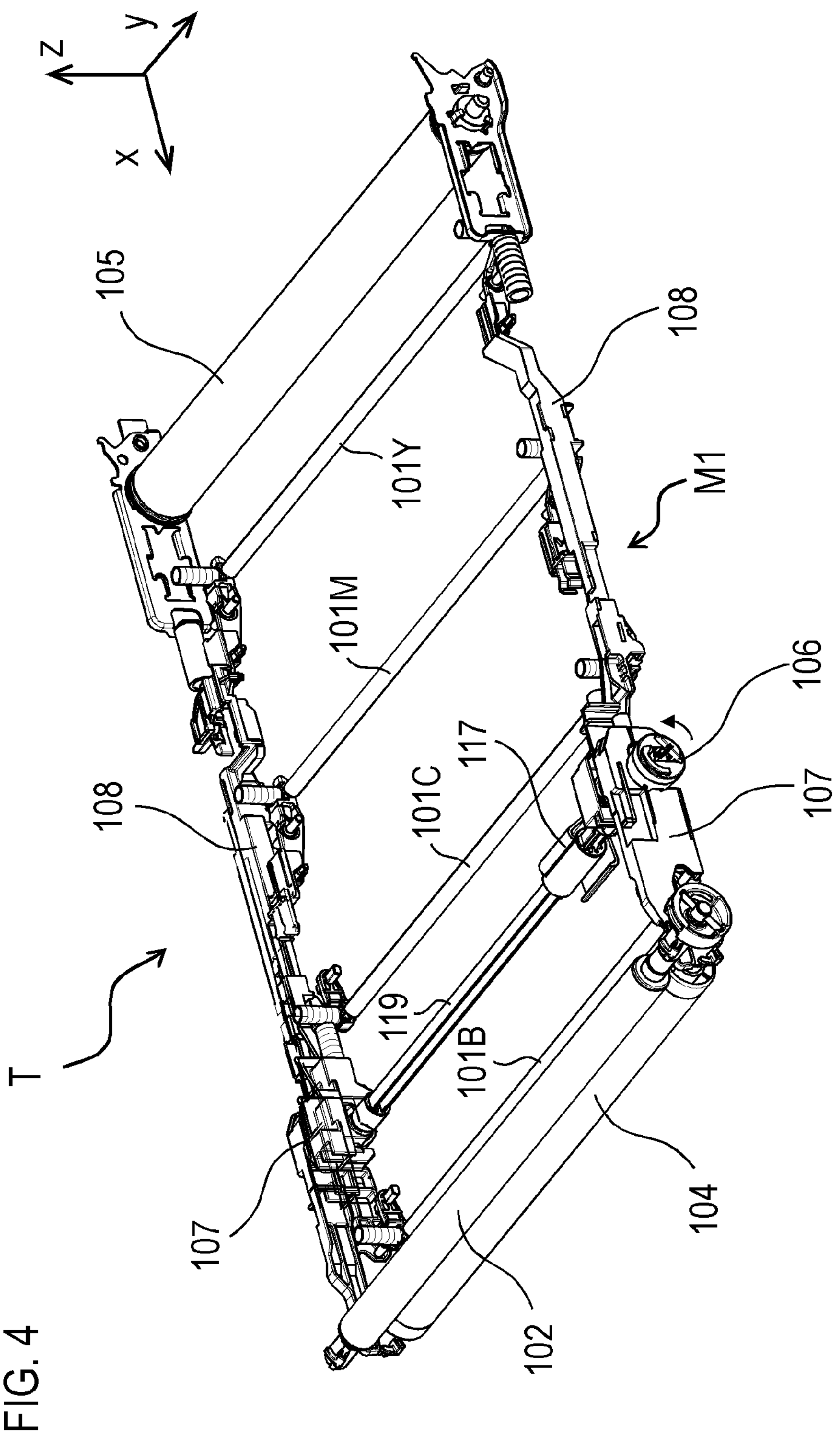
FIG. 4 is a perspective view depicting an internal configuration of the intermediate transfer unit according to Embodiment 1.
Figure 5:
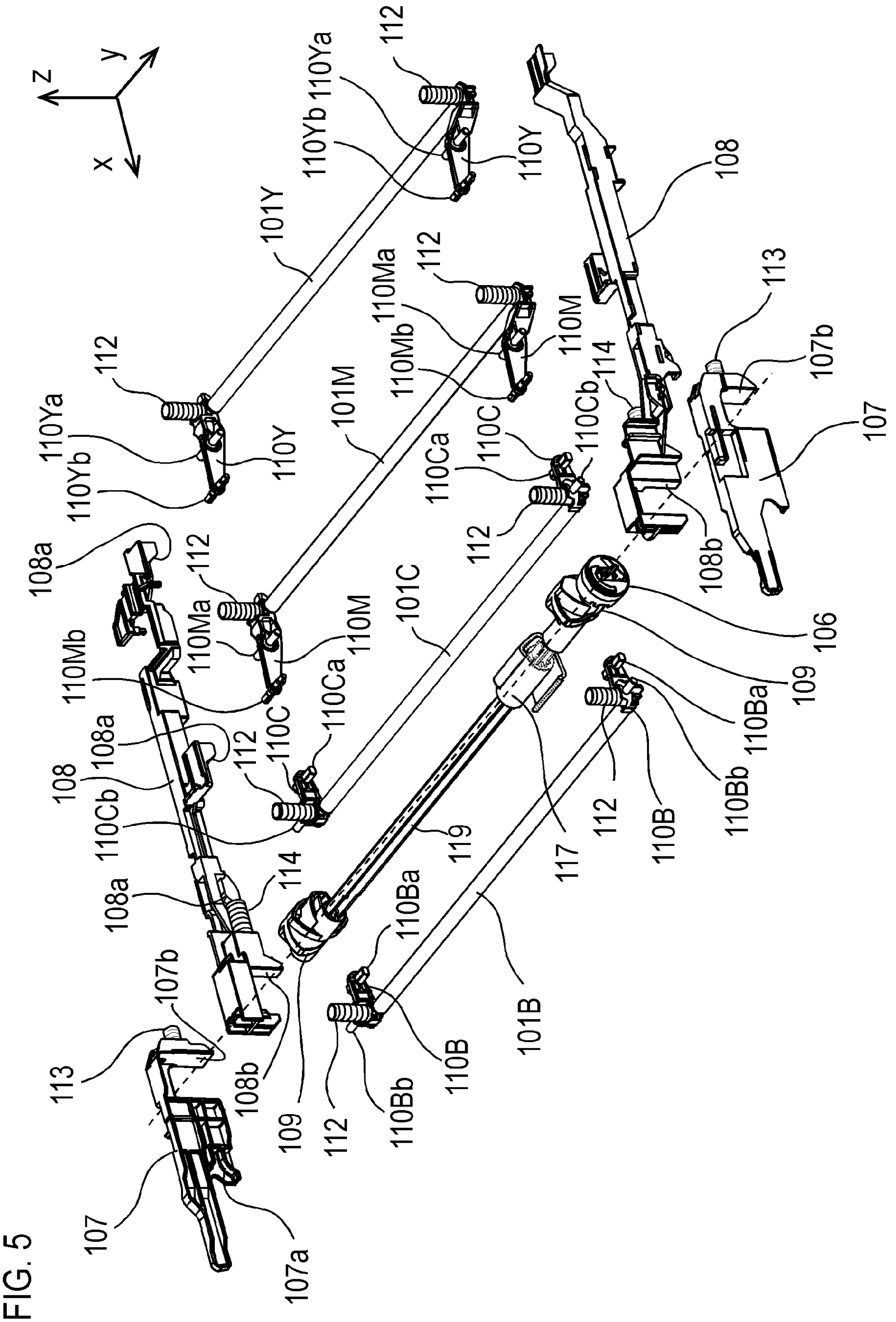
FIG. 5 is an exploded perspective view depicting the internal configuration of the intermediate transfer unit according to Embodiment 1.
Figure 6:
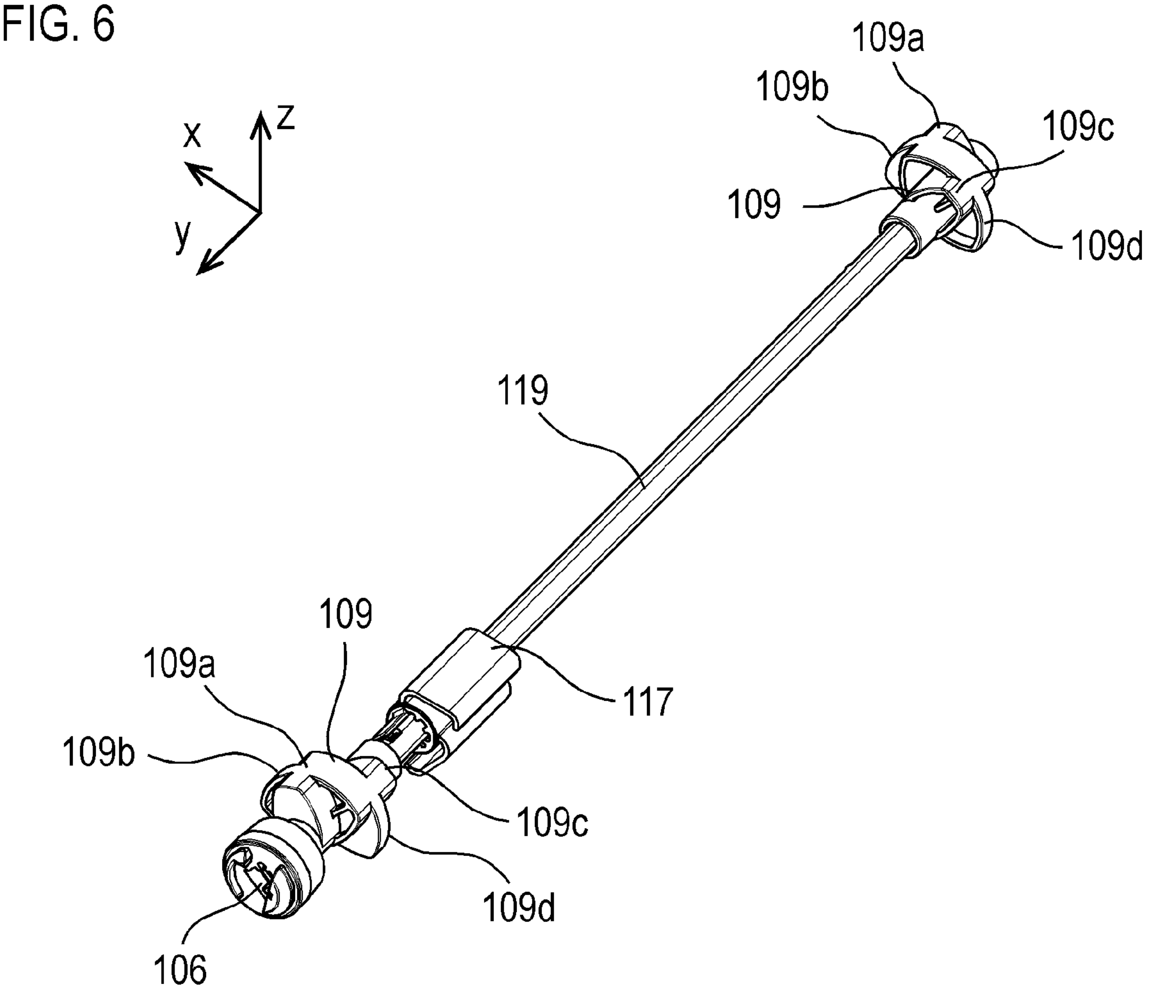
FIG. 6 is a perspective view of a connecting member with a contact/separation driving shaft according to Embodiment 1.

Detailed configuration of the intermediate transfer unit T of the printer P will be described next with reference to FIGS. 1 to 6. FIG. 2 is a perspective view of the intermediate transfer unit T. FIG. 3 is a perspective view of the intermediate transfer unit T in a state where the belt 100 and a cleaning device 103 are removed. FIG. 4 is a perspective view of the intermediate transfer unit T in a state where the belt 100, a casing 111 and the cleaning device 103 are removed. FIG. 5 is an exploded perspective view before assembling the components constituting the intermediate transfer unit T. FIG. 6 is a perspective view of a driving shaft 119 of the intermediate transfer unit T and a member connected to the driving shaft 119.

As illustrated in FIGS. 1 to 4, the intermediate transfer unit T integrally includes the endless belt 100, four primary transfer rollers 101, the belt driving roller 102, the cleaning device 103, a driven roller 104, and a tension roller 105. The primary transfer roller 101, the belt driving roller 102, the driven roller 104, and the tension roller 105 are rotating members which extends in the rotation shaft direction respectively, and are disposed such that the rotation shaft directions of these rollers are parallel with each other.

The four primary transfer rollers 101 are disposed on the inner side of the belt 100 at positions facing the photosensitive drums 2 respectively. The intermediate transfer unit T of Embodiment 1 includes a contact/separation mechanism M1, which is a driving mechanism to contact or separate the primary transfer roller 101 with/from the belt 100. When an image is formed, the primary transfer roller 101 contacts with the belt 100, and presses the belt 100 toward the photosensitive drum 2. When an image is not formed, on the other hand, the primary transfer roller 101 is separated from the belt 100 so as to prevent permanent deformation of the intermediate transfer belt and to reduce wear of the photosensitive drum. In the following, the members constituting the intermediate transfer unit T will be described focusing on various members constituting the contact/separation mechanism M1.

The belt 100 is an endless belt, and is passed around the belt driving roller 102, the driven roller 104 and the tension roller 105. The surface of the belt 100 is an image bearing member, which is an intermediate transfer member that can carry a toner image. Further, on an outer peripheral surface of the belt 100, the cleaning device 103, which removes untransferred toner remaining on the surface of the belt 100, is disposed. As the belt driving roller 102 rotates counterclockwise (in FIG. 1), the belt 100 also rotates interlocking therewith in the same direction. The rotation axis direction of the belt 100 is in parallel with the shaft directions of the four primary transfer rollers 101.

As illustrated in FIG. 2, the intermediate transfer unit T includes a driven member 106 to transfer the driving force to operate the four primary transfer rollers 101. A driving force is selectively transferred to the driven member 106 from a driving motor M disposed in the printer P via a clutch CL. The driving motor M is connected so as to continuously drive the fixing roller pair 13 during image forming operation. The contact/separation mechanism (driving mechanism) M1 of Embodiment 1 is configured such that the driving force can be distributed from the driving motor M to the driven member 106 using the clutch CL.

As illustrated in FIG. 3, the intermediate transfer unit T has the casing 111 that covers the four primary transfer rollers. Further, as illustrated in FIG. 4, one slide member 107 and one slide member 108 are disposed on each end of the primary transfer roller 101 (101Y, 101M, 101C, 101B) in the shaft direction. The slide member 107 and the slide member 108 are supported by the casing 111, so as to be slidable in the direction perpendicular to the shaft direction of the primary transfer roller 101. By the sliding of the slide member 107, the contact/separation operation of the primary transfer roller 101B and the secondary transfer roller 11 with/from the belt 100 is performed. In the same manner, by the sliding of the slide member 108, the contact/separation operation of the primary transfer rollers 101Y, 101M and 101C with/from the belt 100 is performed.

As illustrated in FIG. 5, on each end of the primary transfer roller 101 (101Y, 101M, 101C, 101B) in the shaft direction, a support member 110 (110Y, 110M, 110C, 110B), to be connected with the casing 111, is disposed. The support member 110 (110Y, 110M, 110C, 110B) includes an oscillating shaft 110*a* (110Ya, 110Ma, 110Ca, 110Ba) and a boss 110*b* (110Yb, 110Mb, 110Cb, 110Bb). The oscillating shaft 110*a* and the boss 110*b* extend from the support member 110 in the shaft direction of the primary transfer roller 101 respectively. Each support member 110 is supported to the casing 111 by the oscillating shaft 110*a* so as to be oscillatable, and can oscillate between a contact position where the primary transfer roller 101 is in contact with the belt 100, and a separation position where the primary transfer roller 101 is separated from the belt 100. A primary transfer spring 112 (compression spring) is installed in the support member 110, so that the support member 110 is oscillated by a predetermined elastic force of the primary transfer spring 112, whereby the primary transfer roller 101 is energized in the direction toward the photosensitive drum 2.

To the driven member 106, the driving shaft 119, which is a rotation shaft member for the primary transfer roller 101 to perform the contact/separation operation, is connected. As illustrated in FIG. 6, the driving shaft 119 is connected to an eccentric cam 109 at each end in the shaft direction, and a damper member 117 is disposed on the shaft. The eccentric cam 109 includes a driving cam portion 109*a* and a driving cam portion 109*b* which slidably contact with the slide member 107, and a driving cam portion 109*c* and a driving cam portion 109*d* which slidably contact with the slide member 108, so that cams having different phases are integrated. When the eccentric cam 109 is rotated in tandem with the driving shaft 119 and the orientation of the eccentric cam 109 is changed thereby, the slide member 107 and the slide member 108, which can slidably contact with the eccentric cam 109, slide. The slide members 107 and 108 can move to an operation position (first position), where the support member 110 is positioned at a separation position resisting the energizing force of the primary transfer spring 112, and to a non-operation position (second position), where [the energizing force] does not act on the support member 110, and the support member 110 is fixed at the contact position.

The damper member 117 rotates in tandem with the driving shaft 119 and the eccentric cam 109, and is a member that brakes the rotation of the driving shaft 119 by contacting with the casing 111 (opposing member) and elastically deforming thereby. The damper member 117 is disposed on the driving shaft 119 in the shift direction, at a position closer to the eccentric cam 109, which is disposed on one end of the driving shaft 119. At a position of the casing 111 facing the damper member 117, a depressed portion 111*a* (see FIG. 3) that is depressed in a direction away from the driving shaft 119, is formed. When the primary transfer roller 101 performs the contact/separation operation, the damper member 117 contacts the depressed portion 111*a* and elastically deforms, whereby an effect to reduce the collision sound can be acquired. A characteristic of the present disclosure is that the damper member 117 is disposed on the driving shaft 119 of the contact/separation mechanism M1. Details on the collision sound reducing effect using the damper member 117 will be described later.

The slide member 107 includes: an elevating cam 107*a* including an inclined surface which is inclined with respect to the moving direction of the primary transfer roller 101B; and a cam force receiving portion 107*b*. The slide member 107 slides relative to the support member 110B, whereby the elevating cam 107*a* slide-contacts with a boss 110Bb of the support member 110B. Then the support member 110B oscillates such that the primary transfer roller 101B contacts with or separates from the belt 100. Further, the slide member 107 is configured so as to be slidable when the contact state between the eccentric cam 109 and the cam force receiving portion 107*b* is changed by the rotation of the eccentric cam 109.

The slide member 108 includes three elevating cams 108*a* having inclined surfaces which extend to the primary transfer rollers 101Y, 101M and 101C respectively in the inclined state, and a cam force receiving portion 108*b*. When the slide member 108 slides relative to the support member 110Y, the elevating cam 108*a* slide-contacts with a bass 110Yb of the support member 110Y. Then the support member 110Y oscillates such that the primary transfer roller 101Y contacts with or separates from the belt 100. The movement of the primary transfer rollers 101M and 101C and the support members 110M and 110C are the same as the primary transfer roller 101Y and the support member 110Y, hence description thereof will be omitted. As mentioned above, the primary transfer roller 101 is contacted with or separates from the belt 100 by the slide-contact to the inclined surface of the boss and the elastic force of the primary transfer spring 112. In other words, Embodiment 1 includes a plurality of contact/separation members, and the primary transfer roller 101B (first contact/separation member) and any of the primary transfer rollers 101Y, 101M and 101C (second contact/separation member) can be driven independently. Further, in the slide member 108, the contact state of the eccentric cam 109 and the cam force receiving portion 108*b* is changed by the rotation of the eccentric cam 109, whereby the slide member 108 can slide.

On the slide member 107, a slide spring 113, which is a compression spring to energize the slide member 107 in a direction to separate the primary transfer roller 101 from the belt 100, is disposed. In the same manner, on the slide member 108, a slide spring 114, which is a compression spring to energize the slide member 108 in a direction to separate the primary transfer roller 101 from the belt 100, is disposed. These slide springs are members to prevent the moving speed of the slide member from becoming excessively fast. When the slide member 107 is at an operation position, the slide spring 113 energizes the slide member 107 in a direction of maintaining the contact state of the eccentric cam 109 and the cam force receiving portion 107*b*. The relationship between the slide member 108 and the slide spring 114 is also the same. The relationship between the slide operation of the slide member and the energization of the elastic force of the slide spring will be described in detail later.

The contact/separation mechanism M1 that performs the contact/separation operation of the primary transfer roller 101 with/from the belt 100 is constituted of the driven member 106, the driving shaft 119, the eccentric cam 109, the damper member 117, the slide member 107, the slide member 108, the casing 111, and the like, as described above. In the contact/separation mechanism M1, the driven member 106 is rotated in tandem with the driving shaft 119 and the eccentric cam 109 by the driving force of the driving motor M, and the slide member 107 and the slide member 108 slide thereby. Then the support member 110 is moved by the slide operation of the slide member 107 and the slide member 108, and the primary transfer roller 101, supported by the support member 110, is contacted with or separated from the belt 100. Further, in the contact/separation operation, the damper member 117 contacts with the depressed portion 111*a* of the casing 111, whereby the rotation of the driving shaft 119 and the eccentric cam 109 brakes, thereby the collision sound is reduced.

As mentioned above, the contact/separation mechanism M1 of Embodiment 1 operates the primary transfer roller 101 by distributing the driving force from the driving means, which drives other member (e.g. fixing roller) at a constant speed, appropriately using a clutch or the like. In the case of this configuration, the operation of switching the rotation direction of the driving means for the contact/separation operation and the operation to perform the stop and start of driving alternately are restricted during the image forming operation. Therefore to switch the operation mode based on the contact/separation mechanism M1, a method of switching from the full separation mode to monochrome mode and full color mode, then back to the full separation mode (rotary system) is used.

Operation Mode

Operation of the primary transfer roller 101 in the intermediate transfer unit T and switching of the operation mode of the printer P will be described next with reference to FIGS. 7A and 7B, FIGS. 8A and 8B, and FIGS. 9A and 9B. In each of the three operation modes (full separation mode, monochrome mode, full color mode) based on the image forming operation, the positions of the four primary transfer rollers 101 are different. The three operation modes of Embodiment 1 are switched by rotating in sequence, that is: full separation mode, monochrome mode, full color mode, then back to full separation mode.

Figure 7A:
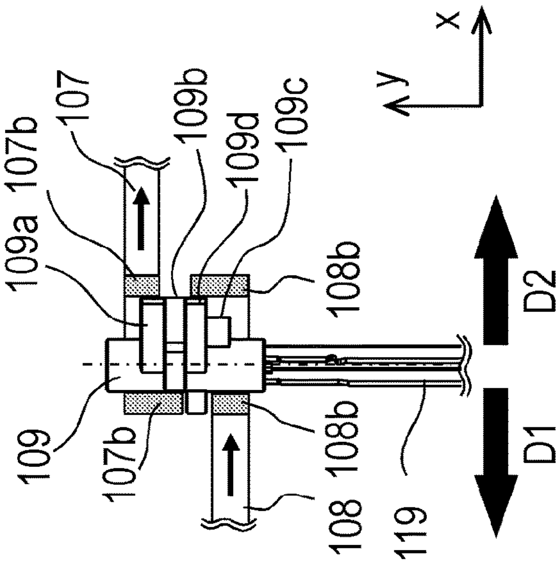
FIGS. 7A and 7B are diagrams depicting the internal transfer unit in the full separation mode according to Embodiment 1.
Figure 7B:
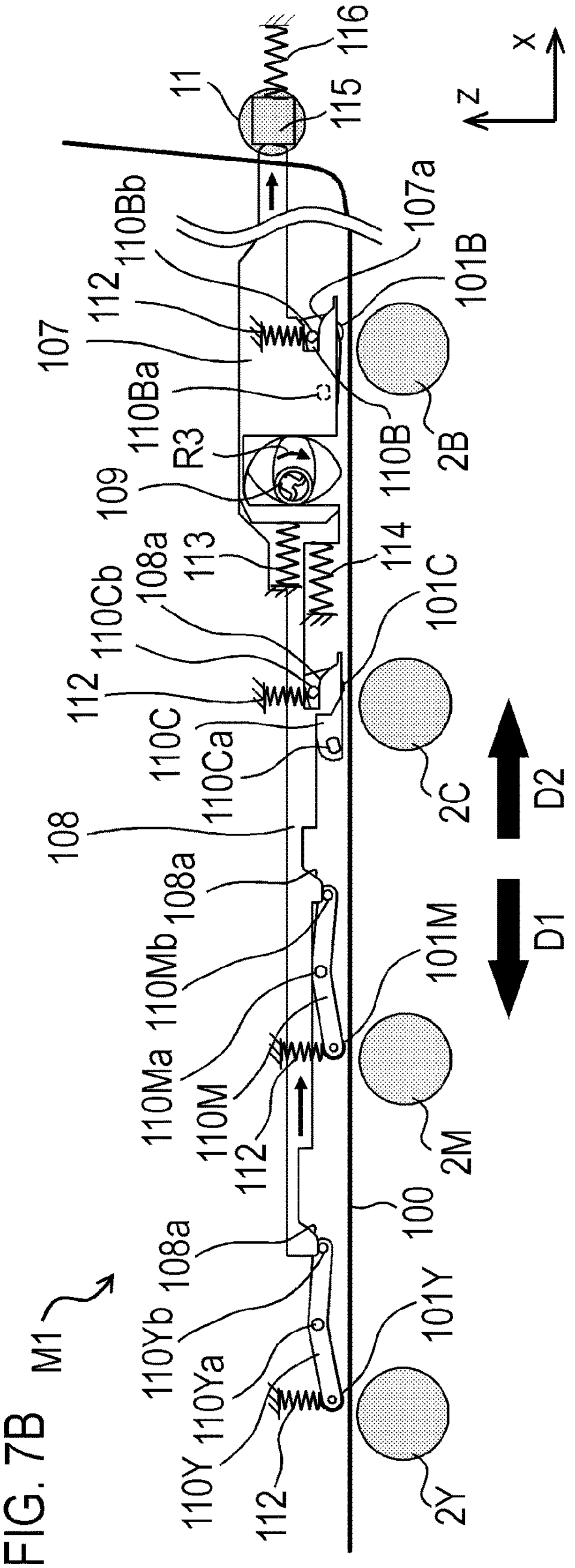
Figure 8A:
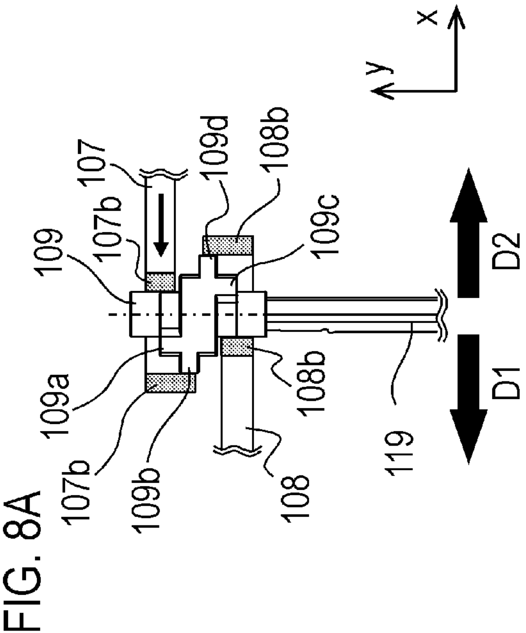
FIGS. 8A and 8B are diagrams depicting the internal transfer unit in the monochrome mode according to Embodiment 1.
Figure 8B:
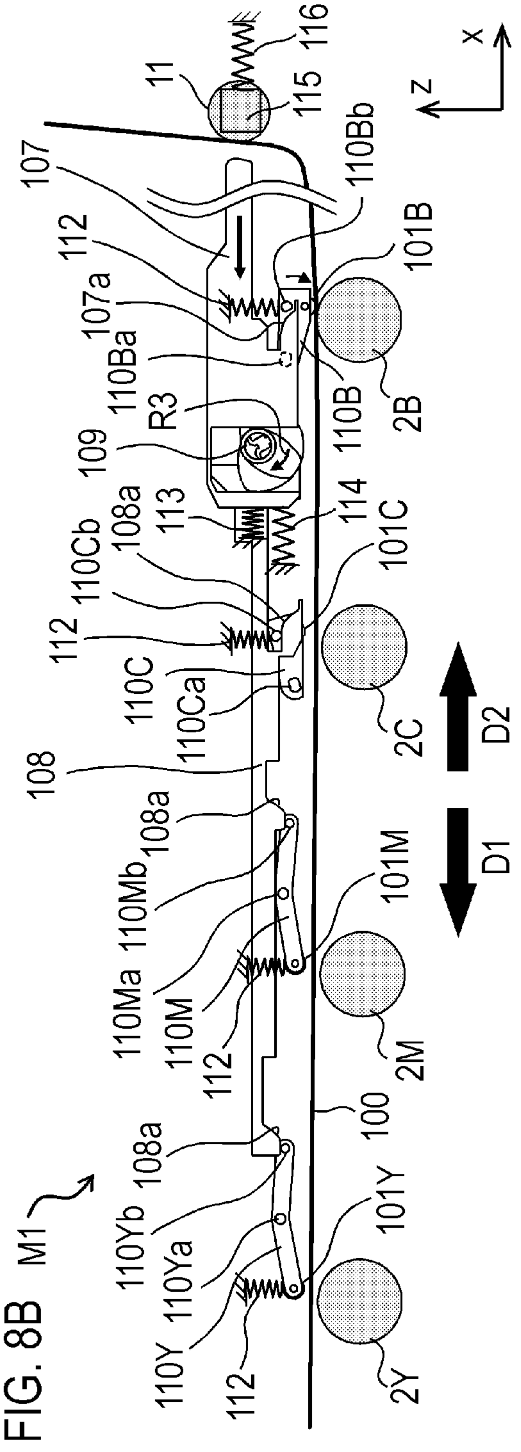
Figure 9A:
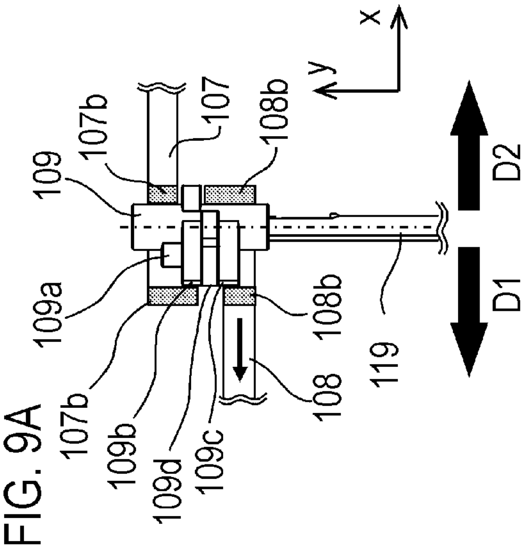
FIGS. 9A and 9B are diagrams depicting the internal transfer unit in the full color mode according to Embodiment 1.
Figure 9B:
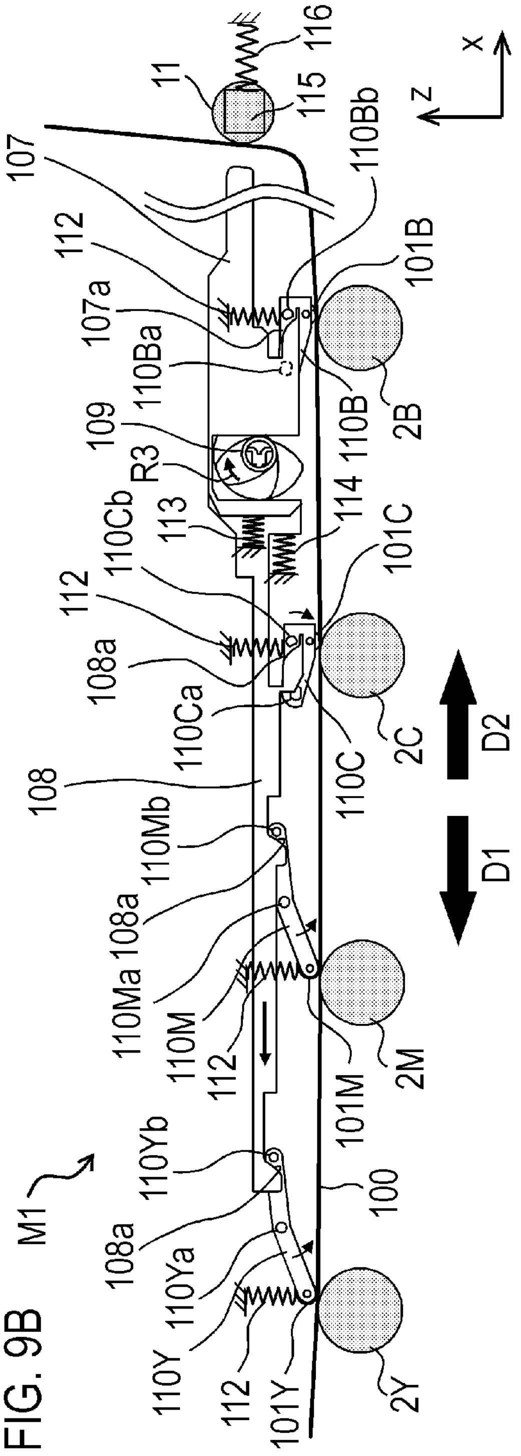

FIGS. 7A and 7B are diagrams for describing the contact/separation mechanism M1 in the full separation mode, in which all the primary transfer rollers 101 are separated from the belt 100. FIGS. 8A and 8B are diagrams for describing the contact/separation mechanism M1 in the monochrome mode, in which the primary transfer roller 101B is contacted with the belt 100, and the primary transfer rollers 101Y, 101M and 101C are separated from the belt 100. FIGS. 9A and 9B are diagrams for describing the contact/separation mechanism M1 in the full color mode, in which all the primary transfer rollers 101 are contacted with the belt 100. In FIGS. 7A and 7B, FIGS. 8A and 8B, and FIGS. 9A and 9B, the rotation direction and operation direction of each member indicated by the arrow marks are operation directions just before the shift to each mode is completed. For example, the arrow marks indicated in the monochrome mode in FIGS. 8A and 8B indicate the directions in which the slide member 107 moves when the full separation mode is shifted to the monochrome mode, as indicated in FIGS. 7A and 7B. Now details on each operation mode of the intermediate transfer unit T will be described respectively. In the following description, the moving directions of the slide members 107 and 108, to move the primary transfer rollers 101 in the direction of contacting with the belt 100, are defined as the first direction D1, and the moving directions of the slide members 107 and 108, to move the primary transfer roller 101 in the direction of separating from the belt 100, are defined as the second direction D2. In other words, the slide members 107 and 108 are located at non-operation positions by moving in the first direction D1, so as to not operate on the support member 110, and the support member is fixed at the contact position. Further, [the slide members 107 and 108] are located at the operation positions by moving in the second direction D2, so as to position the support member 110 at the separation position resisting the energizing force of the primary transfer spring 112.

Full Separation Mode

As a first mode, the full separation mode, in which the intermediate transfer unit T is in the non-image forming state, will be described first. In the full separation mode, the four primary transfer rollers 101Y, 101M, 101C and 101B and the secondary transfer roller 11 are all separated from the belt 100.

FIG. 7A is a diagram viewing the eccentric cam 109, the slide member 107 and the slide member 108 in the full separation mode in a direction (z direction), which is perpendicular to the slide direction of the slide members and the shaft direction of the driving shaft 119. FIG. 7B is a schematic cross-sectional view of the contact/separation mechanism M1 in the full separation mode viewed in the shaft direction (y direction) of the primary transfer roller 101.

In the full separation mode, the driving cam portion 109*a* of the eccentric cam 109 contacts with the cam force receiving portion 107*b* of the slide member 107, and the driving cam portion 109*d* contacts with the cam force receiving portion 108*b* of the slide member 108. In this state, the slide members 107 and 108 are both located at the operation positions.

In the case where the slide member 107 is located at the operation position, the boss 110Bb (regulated portion) contacts with a surface of the elevating cam 107*a* (regulating portion), which is a surface approximately perpendicular to the energizing direction of the primary transfer spring 112, whereby the support member 110B is fixed at a separation position. In other words, the support member 110B supports the primary transfer roller 101B at a position separated from the belt 100 resisting the elastic force of the primary transfer spring 112. In the same manner, in the case where the slide member 108 is located at the operation position, the boss 110Yb (regulated portion) contacts with a surface of the elevating cam 108*a* (regulating portion), which is a surface approximately perpendicular to the energizing direction of the primary transfer spring 112, whereby the support member 110Y is fixed at a separation position. In other words, the support member 110Y supports the primary transfer roller 101Y at a position separated from the belt 100 resisting the elastic force of the primary transfer spring 112. The operations of the support members 110M and 110C and the primary transfer rollers 101M and 101C are the same as the support member 110Y and the primary transfer roller 101Y, hence description thereof will be omitted.

The secondary transfer roller 11 is supported by a support member 115 energized by a secondary transfer spring 116. The support member 115 is energized in the direction toward the belt 100 by the elastic force of a secondary transfer spring 116 (compression spring). The slide member 107 is configured to be contactable or separatable with/from the support member 115, and when the slide member 107 is moved in the second direction, the support member 115 is pushed to the slide member 107 in the direction away from the belt 100. In other words, when the slide member 107 is separated from the support member 115, the secondary transfer roller 11 contacts with the belt 100, but when the support member 115 is pushed by the slide member 107 in the direction resisting the elastic force of the secondary transfer spring 116, the secondary transfer roller 11 is separated from the belt 100. In Embodiment 1, the secondary transfer roller 11 is at a position separated from the belt 100, but the secondary transfer roller 11 and the belt 100 may be in a state of slightly contacting with each other so as not to press the belt 100, and the like.

Monochrome Mode

As a second mode, the monochrome mode, in which the intermediate transfer unit T is in a state where a monochrome image can be formed, will be described next. In the monochrome mode, the primary transfer roller 101B and the secondary transfer roller 11 contact with the belt 100, and the primary transfer rollers 101Y, 101M and 101C are separated from the belt 100.

FIG. 8A is a diagram viewing the eccentric cam 109, the slide member 107 and the slide member 108 in the monochrome mode in the direction (z direction), which is perpendicular to the slide direction of the slide members and the shaft direction of the driving shaft 119. FIG. 8B is a schematic cross-sectional view of the contact/separation mechanism M1 in the monochrome mode viewed in the shift direction (y direction) of the primary transfer roller 101.

In the monochrome mode, the driving cam portion 109*b* of the eccentric cam 109 contacts with the cam force receiving portion 107*b* of the slide member 107, and the driving cam portion 109*d* contacts with the cam force receiving portion 108*b* of the slide member 108. In this state, the slide member 107 is located at the non-operation position, and the slide member 108 is located at the operation position.

In the case where the slide member 107 is located at the non-operation position, the support member 110B is energized by the primary transfer spring 112, and is fixed at the contact position. When the support member 110B is located at the contact position, the primary transfer roller 101B contacts with the belt 100, and the belt 100 is pressed between the photosensitive drum 2B and the primary transfer roller 101B. On the other hand, just like the case of the full separation mode, the slide member 108 is located at the operation position, the support members 110Y, 110M and 110C are at the separation positions, and the primary transfer rollers 101Y, 101M and 101C are at positions separated from the belt 100. When the slide member 107 is separated from the support member 115, which is energized by the secondary transfer spring 116, the support member 115 and the secondary transfer roller 11 move in tandem, and the secondary transfer roller 11 contacts with the belt 100.

Full Color Mode

As a third mode, the full color mode, in which the intermediate transfer unit T is in a state where a full color image can be formed, will be described next. In the full color mode, the four primary transfer rollers 101Y, 101M, 101C and 101B and the secondary transfer roller 11 all contact with the belt 100.

FIG. 9A is a diagram viewing the eccentric cam 109, the slide member 107 and the slide member 108 in the full color mode in the direction (z direction), which is perpendicular to the slide direction of the slide member and the shaft direction of the driving shaft 119. FIG. 9B is a schematic cross-sectional view of the contact/separation mechanism M1 in the full color mode viewed in the shaft direction (y direction) of the primary transfer roller 101. The positional relationship of each member constituting the contact/separation mechanism M1 in the full color mode will be described below.

In the full color mode, the driving cam portion 109*b* of the eccentric cam 109 contacts with the cam force receiving portion 107*b* of the slide member 107, and the driving cam portion 109*c* contacts with the cam force receiving portion 108*b* of the slide member 108. In this state, the slide members 107 and 108 are both located at the non-operation positions.

In the full color mode, just like the case of the monochrome mode, the slide member 107 is located at the non-operation position, the support member 110B is fixed at the contact position, and the primary transfer roller 101B and the secondary transfer roller 11 contact with the belt 100. When the slide member 108 is located at the non-operation position, on the other hand, the support member 110Y is energized by the primary transfer spring 112 and is fixed at the contact position, and the primary transfer roller 101Y contacts with the belt 100. Then the belt 100 is pressed between the photosensitive drum 2Y and the primary transfer roller 101Y. The operations of the support members 110M and 110C and the primary transfer rollers 101M and 101C are the same as the support member 110Y and the primary transfer roller 101Y, hence description thereof will be omitted.

Switching from Full Separation Mode to Monochrome Mode

Details on the operation of each member during the switching operation from the full separation mode to the monochrome mode will be described next. Switching from the full separation mode to the monochrome mode is performed when the driving force of the driving motor M is transferred to the driven member 106 via the clutch CL, and the driving shaft 119 is rotated thereby, and here the intermediate transfer unit T shifts from the state in FIGS. 7A and 7B to the state in FIGS. 8A and 8B.

When the state of the intermediate transfer unit T switches from the full separation mode to the monochrome mode, the eccentric cam 109 rotates in tandem with the driving shaft 119 by 120° in the arrow R3 direction indicated in FIG. 7B. As the eccentric cam 109 rotates, the slide member 107 is pushed by the driving cam portion 109*b* and slides in the first direction D1. The slide member 108, on the other hand, does not slide from the state in the full separation mode, even if the eccentric cam 109 rotates 120°, and the primary transfer rollers 101Y, 101M and 101C remain in the state of being separated from the belt 100.

As the slide member 107 slides in the first direction D1, the boss 110Bb of the support member 110B slide-contacts with the elevating cam 107*a* of the slide member 107. The support member 110B is energized by the primary transfer spring 112 (first energizing member), and while the boss 110Bb is in contact with the inclined surface of the elevating cam 107*a*, the component force of the elastic force of the primary transfer spring 112 acts on the elevating cam 107*a* via the boss 110Bb in the first direction D1. Then when the support member 110B is located at the contact position, the boss 110Bb is separated from the elevating cam 107*a*, and the primary transfer roller 101B presses the belt 100 using the elastic force of the primary transfer spring 112. In the state where the support member 110B is at the contact position, it is not always necessary to separate the boss 110Bb from the elevating cam 107*a*, and the boss 110Bb and the elevating cam 107*a* may be in contact as long as the predetermined press force can be acquired.

While the slide member 107 is in contact with the support member 115, the slide member 107 is also energized by the secondary transfer spring 116 in the first direction D1. When the slide member 107 is separated from the support member 115, the secondary transfer roller 11, supported by the support member 115, contacts with the belt 100 by the elastic force of the secondary transfer spring 116.

Further, during the sliding in the first direction D1, the slide member 107 is energized in the second direction D2 by the slide spring 113 (second energizing member). Since the moving speed of the slide member 107 in the first direction D1 is suppressed by the elastic force of the slide spring 113, the collision sound generated in the contact/separation operation is reduced.

In Embodiment 1, among the forces of each spring member energizing the slide member 107 in the slide direction, the force of the secondary transfer spring 116 is especially strong. The force of the secondary transfer spring 116 energizing the slide member 107 in the first direction D1 is at least 10 times the force of the primary transfer spring 112 energizing the slide member 107 in the first direction D1. A cause making so major a difference in the energizing forces is that in the configuration of Embodiment 1, the expansion/contraction direction of the primary transfer spring 112 is different from the slide direction of the slide member 107, and a part of the elastic force acts on the slide member 107 as the component force. The expansion/contraction direction of the secondary transfer spring 116, on the other hand, is approximately parallel with the slide direction of the slide member 107, hence the elastic force of the secondary transfer spring 116 acts on the slide member 107 more strongly compared with the elastic force of the primary transfer spring 112. Another cause is that the force to make the secondary transfer roller 11 contact with the belt 100 is stronger than the force of making the primary transfer roller 102 contact with the belt 100. The slide spring 113 and the slide spring 114 are disposed to suppress the moving speed of the slide members, and elastic forces thereof are weaker compared with the elastic force of the secondary transfer spring 116.

As mentioned above, the slide member 107 is energized by the secondary transfer spring 116 in the first direction D1, and is energized by the slide spring 113 in the second direction D2. Further, the component force of the elastic force of the primary transfer spring 112 is also applied in a direction to energize the slide member 107 in the first direction D1. Here the elastic forces of the primary transfer spring 112 and the secondary transfer spring 116 must be sufficiently strong in order to press the primary transfer roller 101 and the secondary transfer roller 11 to the opposing members. However, if the elastic forces of the primary transfer spring 112 and the secondary transfer spring 116 are increased, the moving speed of the slide member 107 in the first direction D1 increases. The elastic force of the slide spring 113, on the other hand, is preferably strong enough to suppress the moving speed of the slide member 107 in the first direction D1 to an appropriate value. But if the elastic force of the slide spring 113 is too strong, the moving speed of the slide member 107 increases when the slide member 107 moves in the second direction D2. In this way, the contact/separation mechanism M1 includes a plurality of energizing members, and the elastic force of each energizing member influences various elements. Therefore it is difficult to balance the elastic forces such that the collision sound, generated in the contact operation of the transfer roller, is sufficiently reduced while applying an appropriate pressing force to each transfer roller.

When the slide member 107 moves in the first direction D1 to switch from full separation mode to the monochrome mode, the driving cam portion 109*b* contacts with the cam force receiving portion 107*b*, and the primary transfer roller 101B contacts with the photosensitive drum 2B via the belt 100. Therefore if the slide member 107 is strongly energized in the first direction D1 and the moving speed thereof increases, the collision sound of these members increases. Hence in Embodiment 1, the damper member 117 is disposed on the driving shaft 119 as a damper structure to suppress the moving speed of the slide member 107. Since the damper member 117 contacts with the depressed portion 111*a* of the casing 111 and elastically deforms when the primary transfer roller 101B and the secondary transfer roller 11 perform the contact operation, the moving speed of the slide member 107 is suppressed when [the full separation mode] is shifted to the monochrome mode. A detailed configuration of the damper member 117 will be described later.

Switching from Monochrome Mode to Full Color Mode

Details on the switching operation from the monochrome mode to the full color mode will be described next. Switching from the monochrome mode to the full color mode is performed when the driving force of the driving motor M is transferred to the driven member 106 via the clutch CL, and the driving shaft 119 is rotated thereby, and here the intermediate transfer unit T shifts from the state in FIGS. 8A and 8B to the state in FIGS. 9A and 9B.

When the state of the intermediate transfer unit T switches from the monochrome mode to the full color mode, the eccentric cam 109 rotates in tandem with the driving shaft 119 by 120° in the arrow R3 direction indicated in FIG. 8B. As the eccentric cam 109 rotates, the slide member 108 is pushed by the driving cam portion 109*c* and moves in the first direction D1. The slide member 107, on the other hand, does not slide from the state in the monochrome mode, even if the eccentric cam 109 rotates 120°, and the primary transfer roller 101B and the secondary transfer roller 11 remain in the state of contacting with the belt 100.

As the slide member 108 moves in the first direction D1, the boss 110Yb of the support member 110Y slide-contacts with the elevating cam 108*a* of the slide member 108. The support member 110Y is energized by the primary transfer spring 112, and while the boss 110Yb is in contact with the inclined surface of the elevating cam 107*a*, the component force of the elastic force of the primary transfer spring 112 acts on the elevating cam 108*a* via the boss 110Yb in the first direction D1. Then when the support member 110Y is located at the contact position, the boss 110Yb is separated from the elevating cam 108*a*, and the primary transfer roller 101Y presses the belt 100 using the elastic force of the primary transfer spring 112. In the state where the support member 110Y is at the contact position, it is not always necessary to separate the boss 110Yb from the elevating cam 108*a*, and the boss 110Yb and the elevating cam 108*a* may be in contact as long as the predetermined pressing force can be acquired. The operations of the support members 110M and 110C and the primary transfer rollers 101M and 101C are the same as the support member 110Y and the primary transfer roller 101Y, hence description thereof will be omitted.

Further, during the sliding in the first direction D1, the slide member 108 is energized in the second direction D2 by the slide spring 114. Since the moving speed of the slide member 108 in the first direction D1 is suppressed by the elastic force of the slide spring 114, the collision sound generated in the contact/separation operation is reduced.

As mentioned above, when the slide member 108 moves in the first direction D1, the component forces of the elastic forces of the three primary transfer springs 112 are applied in a direction to energize the slide member 108 in the first direction D1. Further, the slide member 108 is energized in the second direction D2 by the slide spring 114. The elastic force of the primary transfer spring 112 must be set to at least a predetermined value in order to press the primary transfer rollers 101Y, 101M and 101C to the opposing members. However if the elastic force of the primary transfer spring 112 is increased, the moving speed, when the slide member 108 moves in the first direction D1, increases. The elastic force of the slide spring 114, on the other hand, is preferably strong enough to suppress the moving speed of the slide member 108 in the first direction D1 to an appropriate value. But if the elastic force of the slide spring 114 is too strong, the moving speed of the slide member 108 increases when the slide member 108 moves in the second direction D2.

When the slide member 108 moves in the first direction D1 to switch from monochrome mode to the full color mode, the driving cam portion 109*c* contacts with the cam force receiving portion 108*b*. Further, the primary transfer rollers 101Y, 101M and 101C contact with the photosensitive drums 2B, 2M and 2C respectively via the belt 100. Therefore if the slide member 108 is strongly energized in the first direction D1 and the moving speed thereof increases, the collision sound of these members may increase. Hence in Embodiment 1, the damper member 117 is disposed to suppress the moving speed of the slide member 108, so that the collision sound generated in the contact operation of the transfer roller can be sufficiently suppressed while applying appropriate pressing force to the transfer roller. In other words, when [the monochrome mode] is shifted to the full color mode as well, the moving speed of the slide member 108 is suppressed by the damper member 117 contacting with the depressed portion 111*a* of the casing 111, and elastically deforming.

Switching from Full Color Mode to Full Separation Mode

Details on the switching operation from the full color mode to the full separation mode will be described next. Switching from the full color mode to the full separation mode is performed when the driving force of the driving motor M is transferred to the driven member 106 via the clutch CL and the driving shaft 119 is rotated thereby, and here, the intermediate transfer unit T shifts from the state in FIGS. 9A and 9B to the state in FIGS. 7A and 7B.

When the state of the intermediate transfer unit T switches from the full color mode to the full separation mode, the eccentric cam 109 rotates in tandem with the driving shaft 119 by 120° in the arrow R3 direction indicated in FIG. 9B. As the eccentric cam 109 rotates, the slide member 107 is pushed by the driving cam portion 109*a* and slides in the second direction D2, and the slide member 108 is also pushed by the driving cam portion 109*d* and slides in the second direction D2.

When the slide member 107 slides in the second direction D2, the support member 110B moves in the direction of separating the primary transfer roller 101B from the belt 100, while the boss 110Bb is slide-contacting with the elevating cam 107*a*. During this time, the support member 110B moves in the direction resisting the elastic force of the primary transfer spring 112, and the component force of the elastic force of the primary transfer spring 112 acts on the elevating cam 107*a* in the first direction D1 via the boss 110Bb. When the slide member 107 contacts with the support member 115, the slide member 107 is energized in the first direction D1 by the elastic force of the secondary transfer spring 116 via the support member 115. The slide spring 113, on the other hand, energizes the slide member 107 in the second direction D2.

When the slide member 108 slides in the second direction D2, the support member 110Y moves in the direction of separating the primary transfer roller 101Y from the belt 100, while the boss 110Yb is slide-contacting the elevating cam 108*a*. During this time, the support member 110Y moves in the direction resisting the elastic force of the primary transfer spring 112, and the component force of the elastic force of the primary transfer spring 112 acts on the elevating cam 108*a* in the first direction D1 via the boss 110Yb. The slide spring 114, on the other hand, energizes the slide member 108 in the second direction D2.

When the slide member 107 moves in the second direction D2 to switch from the full color mode to the full separation mode, the driving cam portion 109*a* contacts with the cam force receiving portion 107*b*, the elevating cam 107*a* contacts with the boss 110Bb, and the slide member 107 contacts with the support member 115. In the same manner, when the slide member 108 moves in the second direction D2, the driving cam portion 109*d* contacts with the cam force receiving portion 108*b*, and the elevating cam 107*a* contacts with the bosses 110Yb, 110Mb and 110Cb. Therefore if the slide member 107 and the slide member 108 are strongly energized in the second direction D2, and the moving speed thereof increases, the collision sound of these members increases. Hence in Embodiment 1, the damper member 117 suppresses the moving speed of the slide members 107 and 108 when the full color mode is switched. In other words, when [the full color mode] is switched to the full separation mode as well, the moving speed of the slide member 108 is suppressed by the damper member 117 contacting with the depressed portion 111*a* of the casing 111, and elastically deforming.

As described above, the operation mode of the intermediate transfer unit T is switched by the eccentric cam 109 rotating 120° at a time, so that the slide member 107 and the slide member 108 slide in the first direction D1 and the second direction D2 respectively.

Damper Member 117

Figure 10:
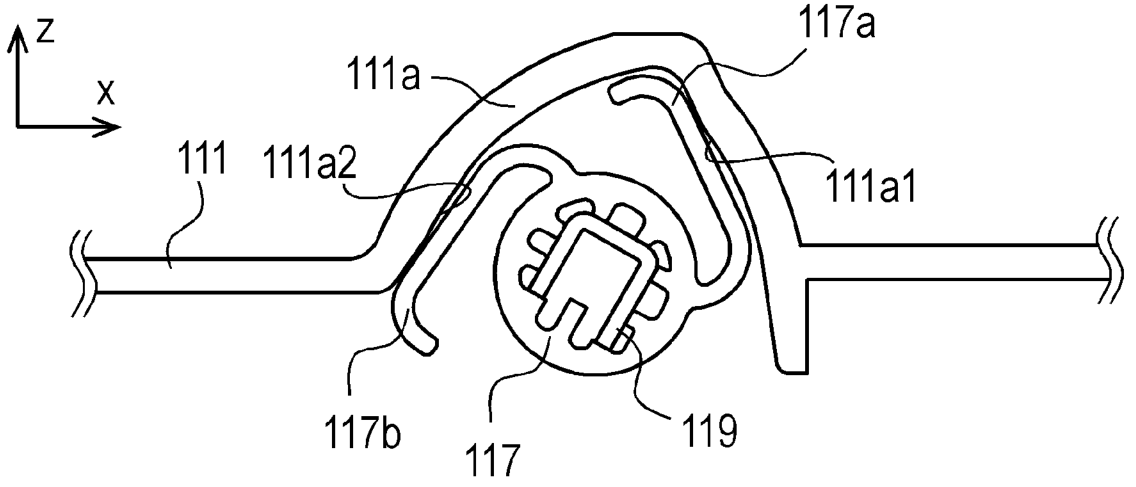
FIG. 10 is a cross-sectional view depicting a braking portion in the full separation mode according to Embodiment 1.
Figure 11:
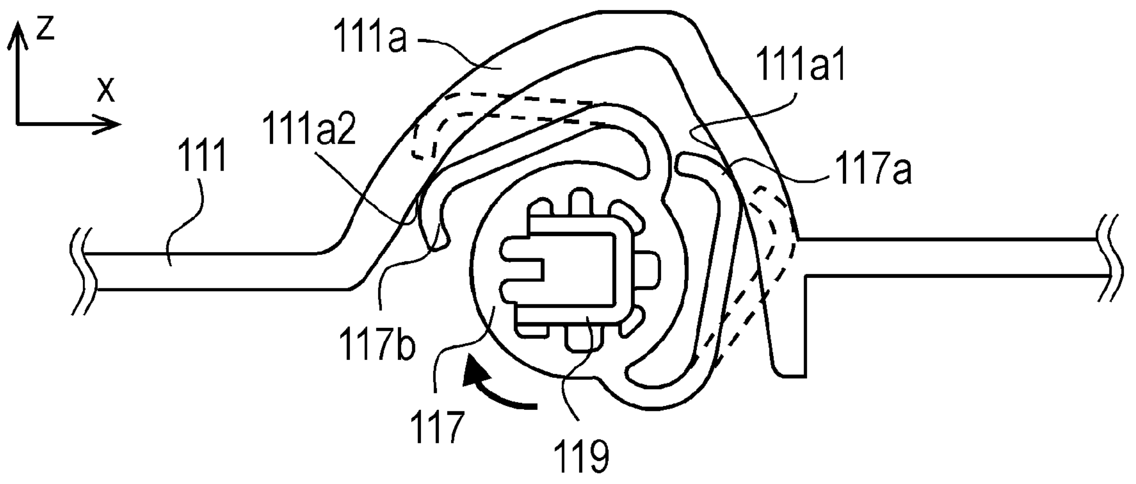
FIG. 11 is a cross-sectional view depicting the braking portion in transition to the monochrome mode according to Embodiment 1.
Figure 12:
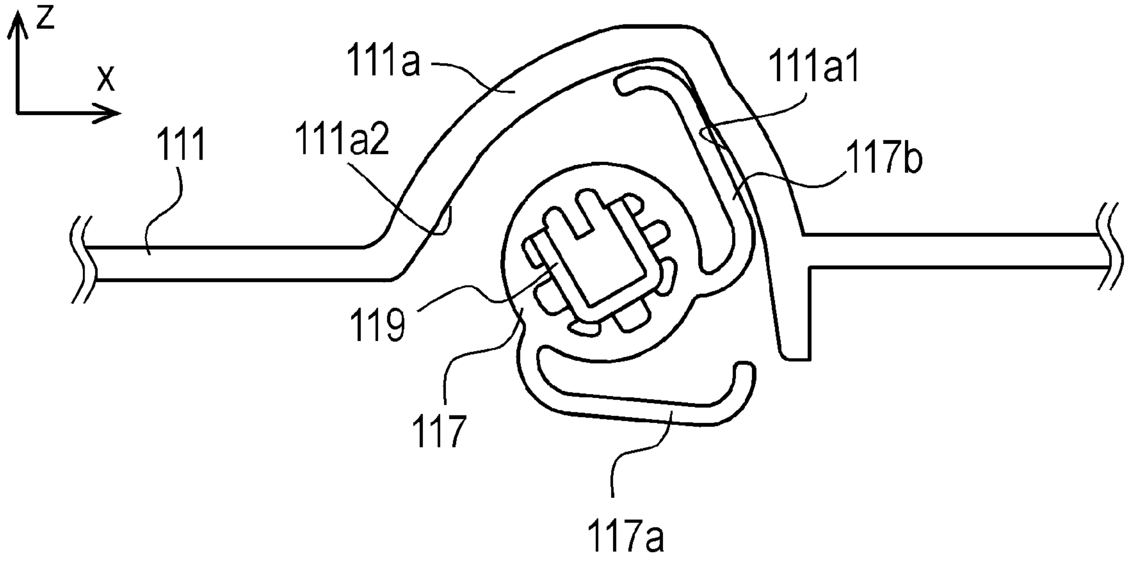
FIG. 12 is a cross-sectional view depicting the braking portion in the monochrome mode according to Embodiment 1.
Figure 13:
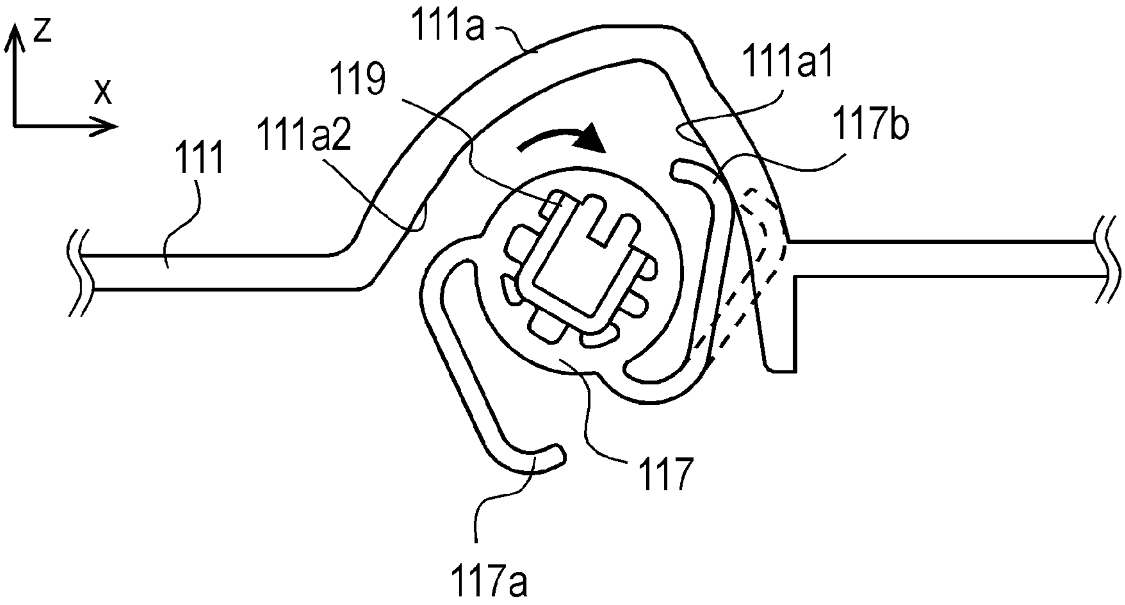
FIG. 13 is a cross-sectional view depicting the braking portion in transition to the full color mode according to Embodiment 1.
Figure 14:
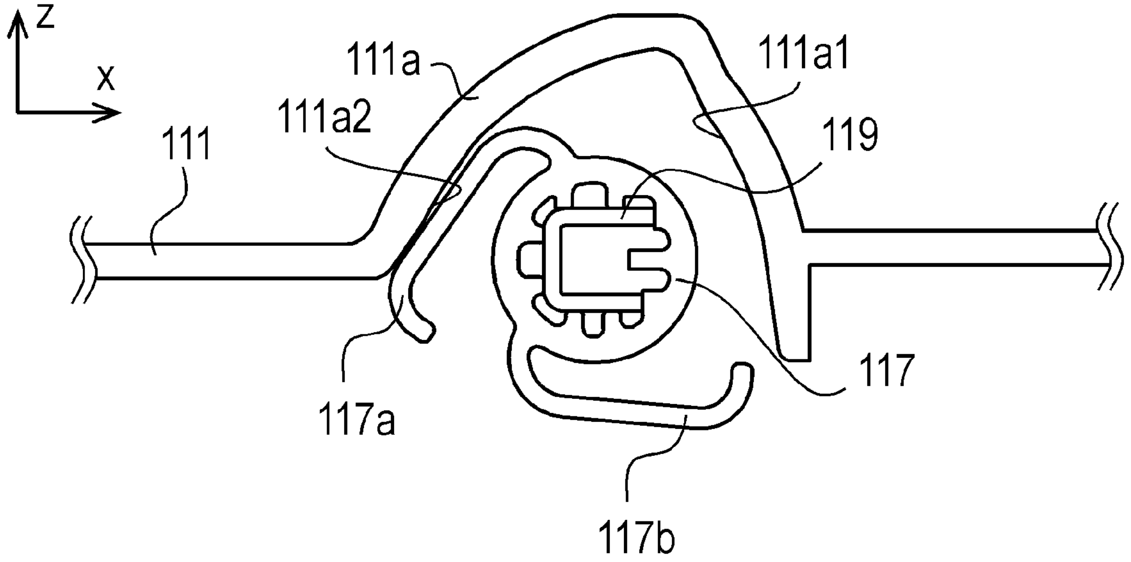
FIG. 14 is a cross-sectional view depicting the braking portion in the full color mode according to Embodiment 1.
Figure 15:
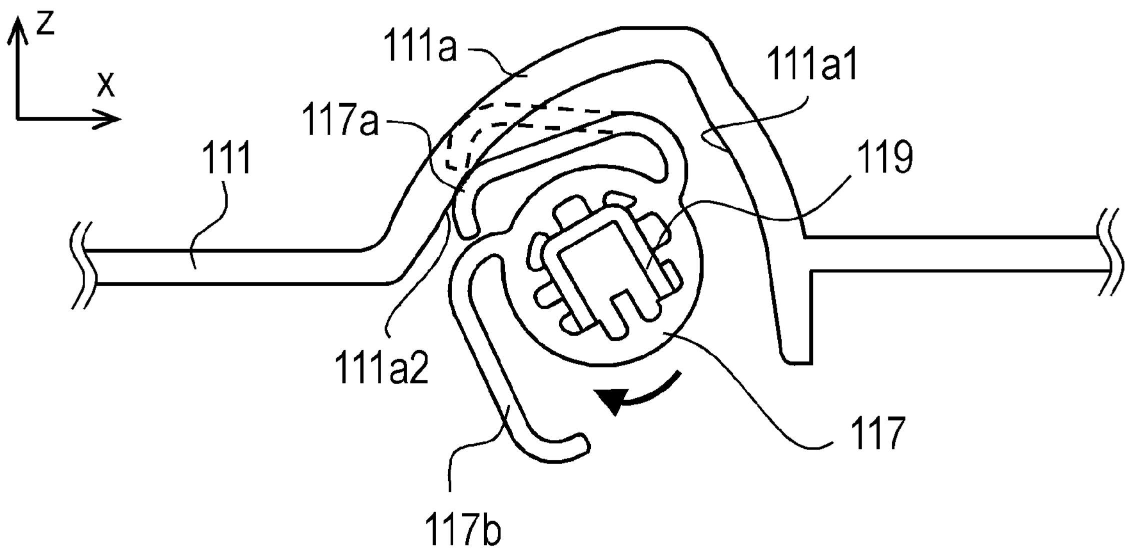
FIG. 15 is a cross-sectional view depicting the braking portion in transition to the full separation mode according to Embodiment 1.

Detailed configuration of the damper member 117 disposed on the driving shaft 119 and the collision sound reduction effect by this configuration will be described next with reference to FIGS. 10 to 15. FIGS. 10 to 15 are schematic cross-sectional views depicting states of the damper member 117. FIG. 10 depicts a state in the full separation mode, FIG. 12 depicts a state in the monochrome mode, and FIG. 14 depicts a state in the full color mode of the damper member 117. FIG. 11 depicts a state during the transition from the full separation mode to the monochrome mode, FIG. 13 depicts a state during the transition from the monochrome mode to the full color mode, and FIG. 15 depicts a state during the transition from the full color mode to the full separation mode of the damper member 117.

The damper member 117 of Embodiment 1 has elastic lever portions 117*a* and 117*b* that extend from one end (which is fixed to the driving shaft 119) to the other end (which is a free end) in a direction intersecting with the shaft direction of the driving shaft 119. Each of the elastic lever portions 117*a* and 117*b* extends in a direction away from the driving shaft 119, is bent toward the upstream side of the driving shaft 119 in the rotating direction then extends linearly, and is then bent again in a direction where the tip portion thereof approaches the driving shaft 119. The tips of the elastic level portions 117*a* and 117*b* are free ends, and the elastic lever portions 117*a* and 117*b* are elastically deformable. The material of the damper member 117 having flexibility is preferably a plastic material, but may be a metal material or the like considering the required braking force, component life span, and the like.

In the shaft direction of the driving shaft 119, the elastic lever portion 117*a* and the elastic lever portion 117*b* are at approximately the same positions on the driving shaft 119. In the rotating direction of the driving shaft 119, the elastic level portion 117*a* is at a position of which phase is about 120° on the downstream side of the elastic level portion 117*b*.

In the direction perpendicular to the shaft direction of the driving shaft 119, the depressed portion 111*a* of the casing 111 is disposed facing the damper member 117. The depressed portion 111*a* is depressed in a direction away from the driving shaft 119, and includes a first contacted portion 111*a*1 and a second contacted portion 111*a*2 with which the elastic lever portions 117*a* and 117*b* contact. The damper member 117 is disposed to be closer to the driven member 106 in the shaft direction of the driving shaft 119, and as illustrated in FIG. 3, the depressed portion 111*a* is also disposed on one end side of the casing 111 in the shaft direction.

In the entire full separation mode illustrated in FIG. 10, the monochrome mode illustrated in FIG. 12 and the full color mode illustrated in FIG. 14, the elastic lever portions 117*a* and 117*b* are disposed with a gap with respect to the depressed portion 111*a*. In other words, in each mode, the elastic lever portions 117*a* and 117*b* are not elastically deformed, and the damper member 117 does not act on the driving shaft 119 at all. Therefore the damper member 117 does not affect the positioning of the slide members 107 and 108. In Embodiment 1, the elastic lever portions 117*a* and 117*b* are completely separated from the depressed portion 111*a*, but may slightly touch the depressed portion 111*a*, as long as the positioning of the slide members 107 and 108 are not influenced.

In the case of switching modes illustrated in FIGS. 11, 13 and 15, on the other hand, at least one of the elastic lever portion 117*a* and the elastic lever portion 117*b* contacts with the depressed portion 111*a* and elastically deforms in tandem with the rotation of the driving shaft 119. In the case of switching from the full separation mode to the monochrome mode illustrated in FIG. 11, the elastic lever portion 117*a* (first flexible portion) contacts with the first contacted portion 111*a*1, and the elastic lever portion 117*b* (second flexible portion) contacts with the second contacted portion 111*a*2. Then both the elastic lever portions 117*a* and 117*b* contact with the depressed portion 111*a* and are elastically deformed. In the case of switching from the monochrome mode to the full color mode illustrated in FIG. 13, only the elastic lever portion 117*b* (second flexible portion) contacts with the first contacted portion 111*a*1 of the depressed portion 111*a* and is elastically deformed. In the case of switching from the full color mode to the full separation mode illustrated in FIG. 15, only the elastic lever portion 117*a* (first flexible portion) contacts with the second contacted portion 111*a*2 of the depressed portion 111*a* and is elastically deformed.

As described above, according to the configuration of Embodiment 1, the elastic lever portions 117*a* and 117*b* are elastically deformed when a mode is switched, hence force acts on the driving shaft 119 in a direction of braking the rotation. Since the eccentric cam 109 and the damper member 117 are disposed on the same rotation shaft member, the braking force, to suppress the rotation of the driving shaft 119, is applied during the contact/separation operation, and the slide speeds of the slide members 107 and 108 are suppressed thereby. This means that the slide members 107 and 108 are energized in the slide direction by a plurality of energizing members, but the moving speeds of the slide members 107 and 108 are prevented from becoming too fast, because of the braking effect of the damper member 117. Furthermore, a strong collision between the primary transfer roller and the belt, or between the eccentric cam and the slide members or the like, can be prevented, and the collision sound thereof can be reduced. Moreover, compared with a conventional configuration where an elastic member disposed to reduce the collision sound is formed of sponge, rubber or the like, the damper member of Embodiment 1 excels in durability, hence the effect of reducing the collision sound can be continued for a lengthy period of time.

In the contact/separation mechanism M1 of Embodiment 1, among the plurality of energizing members to energize the slide member in the slide direction, the elastic force of the secondary transfer spring 116 is stronger than the elastic forces of the other energizing members, as mentioned above. In other words, the moving speed of the slide member 107 in the first direction, which is energized by the secondary transfer spring 116 in the first direction, tends to become fast, and the collision sound generated thereby tends to become louder. To prevent this, in the configuration of Example 1, both the elastic lever portions 117*a* and 117*b* elastically deform when the full separation mode is switched to the monochrome mode, where the slide member 107 moves in the first direction D1, as mentioned above. In other words, in the case of switching the full separation mode to the monochrome mode, a stronger breaking force is applied to the driving shaft 119 compared with the cases of other mode switching. Thus the intermediate transfer unit T is configured such that both the elastic lever portions 117*a* and 117*b* are elastically deformed in a mode switching that required a strong braking force, and only one of the elastic lever portions 117*a* and 117*b* is elastically deformed in the cases of other mode switching. By this configuration, an excessive increase in the driving torque during the contact/separation operation of the transfer roller can be prevented, therefore the effect of reducing the collision sound can be adjusted in accordance with the energizing force that is applied during the contact/separation operation. Further, according to this configuration, a plurality of elastic lever portions can be elastically deformed simultaneously, hence the collision sound can be reduced considerably.

Furthermore, as mentioned above, the elastic lever portions 117*a* and 117*b* are disposed at the same position in the rotation shaft direction of the driving shaft 119, and at positions in different phases in the rotation direction. Therefore according to this configuration, the braking force can be increased in a small space, compared with the configuration of disposing a plurality of elastic lever portions in the rotation shaft direction, or the configuration of increasing the width of the elastic lever portions, in order to increase the braking force.

The application of the present disclosure is not limited to the above mentioned configuration of Embodiment 1. For example, the depressed portion 111*a* is formed on the casing 111 in Embodiment 1, but another cover member that is different from the casing 111 may be disposed so as to face the damper member 117. Further, the damper member 117 of Embodiment 1 is configured such that the elastic lever portion thereof is integrated with the mounting portion on the driving shaft 119, but the damper member may be constituted of a plurality of components. Moreover, the elastic lever portion 117*a* and the elastic lever portion 117*b* of the damper member 117 may be formed in different shapes in order to differentiate the braking force between the case of transiting to the full color mode and the case of transiting to the full separation mode.

The printer of Embodiment 1 has three modes, but the present disclosure is also applicable to a printer having two modes or four or more modes. By configuring such that a plurality of elastic lever portions elastically deform to apply a strong braking force when mode is switched, regardless the number of modes of the printer, the collision sound when the transfer roller performs the contact/separation operation can be reduced. Further, in Embodiment 1, both the elastic lever portions 117*a* and 117*b* are elastically deformed when the full separation mode is switched to the monochrome mode, based on the difference of the energizing forces among the energizing members. But the present disclosure is not limited to [the configuration] based on the difference of the energizing forces among the energizing members in Embodiment 1. For example, both the elastic lever portions 117*a* and 117*b* may elastically deform only when the full color mode is switched to the full separation mode, where the transfer roller is separated. In other words, both the elastic lever portions 117*a* and 117*b* elastically deform in the case of mode switching, where the collision sound separated in the contact/separation operation becomes louder, then the effect similar to the effect described in Embodiment 1 can be acquired. Thus various changes are possible within the scope not departing from the spirit of the disclosure carried out in Embodiment 1.

Embodiment 2

Figure 16:
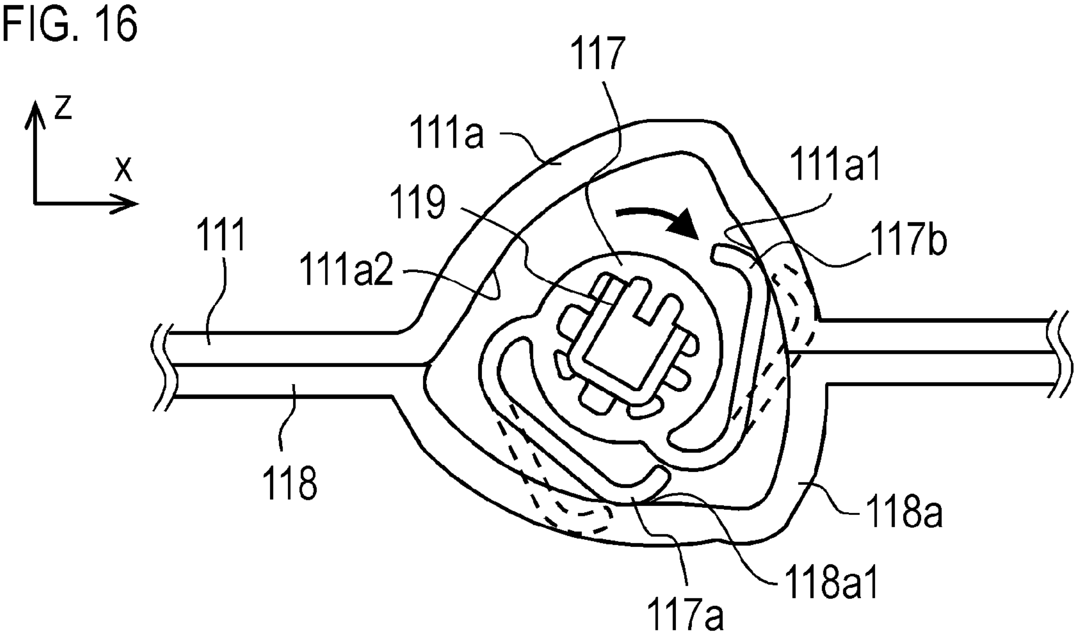
FIG. 16 is a cross-sectional view depicting a braking portion in mode transition according to Embodiment 2.

Embodiment 2 of the present disclosure will be described next with reference to FIG. 16. The basic configuration of an image forming apparatus of Embodiment 2 is the same as that of Embodiment 1, and an identical or similar portion as Embodiment 1 is denoted with a same reference sign, and redundant description thereof will be omitted. In the following, portions that are different from Embodiment 1 will be mainly described. FIG. 16 is a schematic cross-sectional view of the damper member 117 and the casing 111 according to Embodiment 2, illustrating the state during the transition from the monochrome mode to the full color mode.

On the casing 111 of Embodiment 2, a casing cover 118 is installed by screws (not illustrated). By the casing cover 118, a depressed portion 118*a*, which depresses to the opposite side of the depressed portion 111*a*, is formed at a position facing the depressed portion 111*a* in the casing 111. The damper member 117 is completely surrounded by the depressed portion 111*a* and the depressed portion 118*a*, and the elastic lever portions 117*a* and 117*b* are elastically deformed by contacting the depressed portion 118*a* as well. In other words, in Embodiment 2, a third contacted portion 118*a*1 is formed in the depressed portion 118*a*, in addition to the first contacted portion 111*a*1 and the second contacted portion 111*a*2 in the depressed portion 111*a*. By this configuration, the plurality of elastic levers can be elastically deformed simultaneously not only in the transition from the full separation mode to the monochrome mode, but also in the transition from the monochrome mode to the full color mode, and in the transition from the full color mode to the full separation mode. Therefore according to Embodiment 2, loud collision sound can be reduced in all mode switching cases. In other words, this configuration is especially effective to uniformly increase the braking force using the damper member in all mode switching cases.

In Embodiment 2, the casing cover 118, which is a separate member, is connected with the casing 111, but a portion having the same shape as the casing cover 118 may be integrally formed with the casing 111. Further, the damper member 117 of Embodiment 2 has two elastic lever portion, but a configuration having three elastic lever portions may be used. With this configuration, a plurality of elastic lever portions can be elastically deformed when a mode is switched, without disposing the casing cover 118.

Embodiment 3

Figure 17:
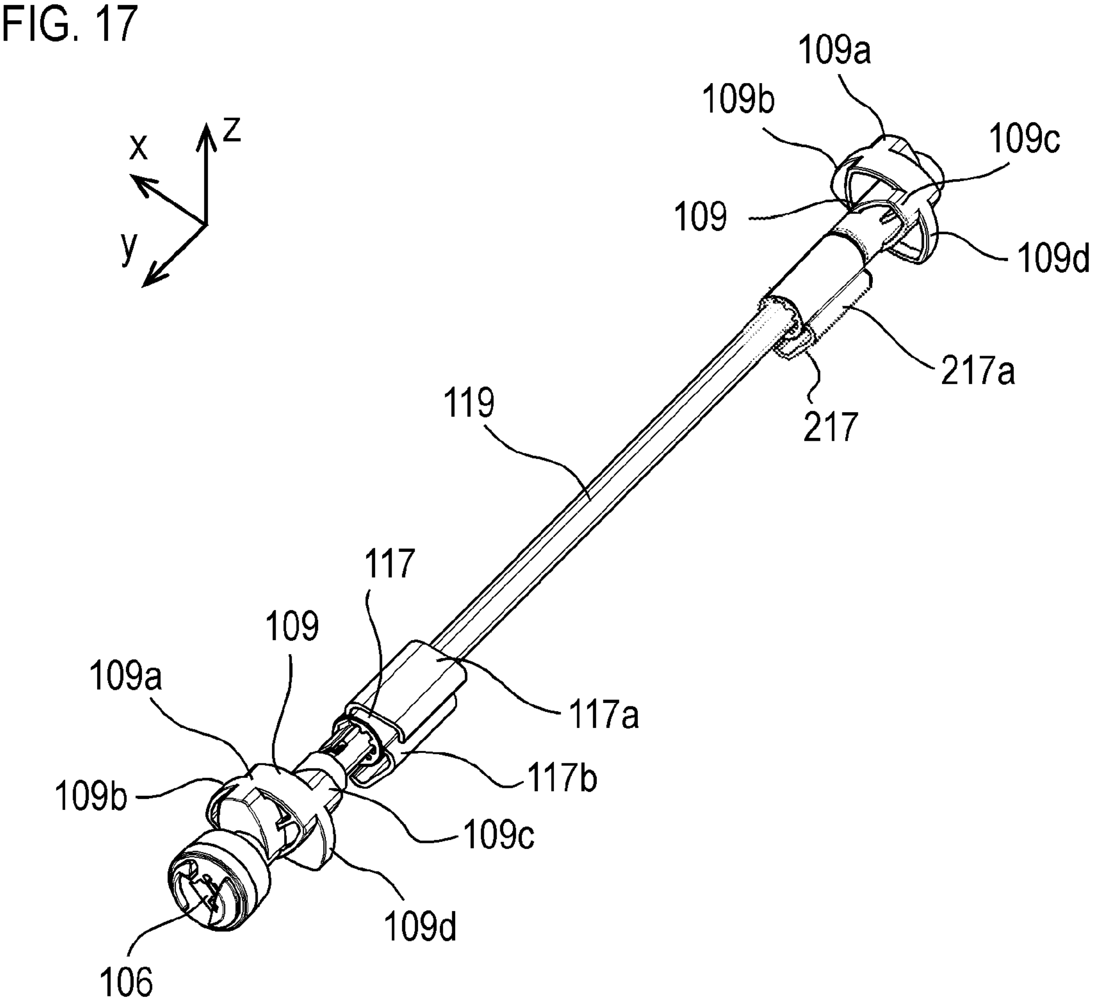
FIG. 17 is a perspective view depicting a contact/separation driving shaft and a connecting member according to Embodiment 3.
Figure 18A:
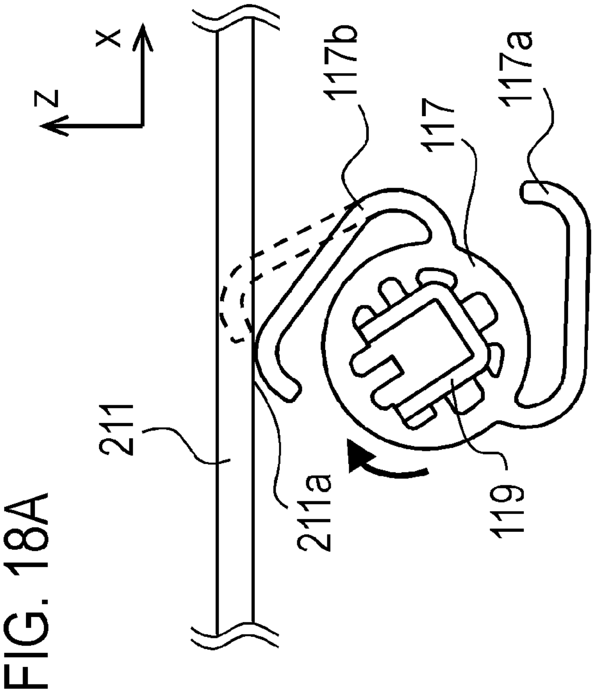
FIGS. 18A and 18B are cross-sectional views depicting a braking portion in transition to the monochrome mode according to Embodiment 3.
Figure 18B:
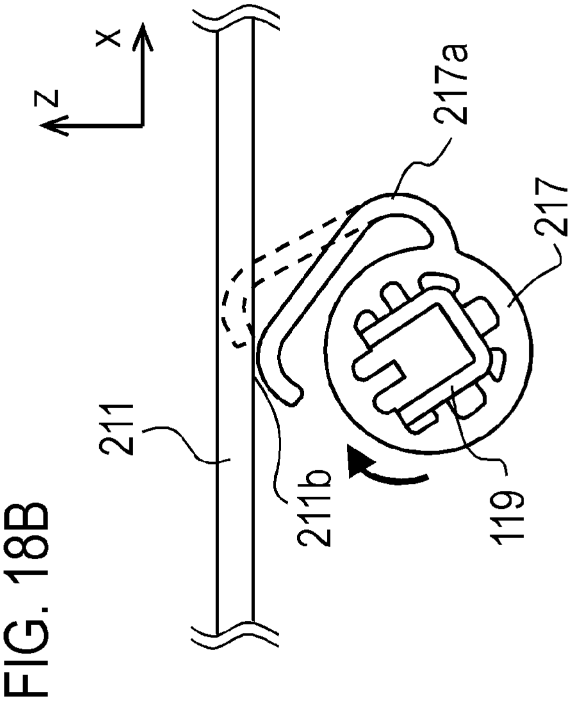

Embodiment 3 of the present disclosure will be described next with reference to FIGS. 17, 18A and 18B. The basic configuration of an image forming apparatus of Embodiment 3 is the same as Embodiment 1, and an identical or similar portion as Embodiment 1 is denoted with a same reference sign, and redundant description thereof will be omitted. In the following, portions that are different from Embodiment 1 will be mainly described. FIG. 17 is a perspective view of a driving shaft 119 of the intermediate transfer unit T and a connecting member connected to the driving shaft 119 according to Embodiment 3. FIG. 18A is a schematic cross-sectional view illustrating a state of the damper member 117 during the transition from the full separation mode to the monochrome mode according to Embodiment 3. FIG. 18B is a schematic cross-sectional view illustrating a state of a damper member 217 during the transition from the full separation mode to the monochrome mode according to Embodiment 3.

On the driving shaft 119 of Embodiment 3, in addition to the damper member 117, a damper member 217 is disposed as the damper configuration at a position that is different from the position of the damper member 117 in the shaft direction of the driving shaft 119. The damper member 217 includes an elastic lever portion 217*a* that is similar to the elastic lever portion 117*b* of the damper member 117. The elastic lever portion 217*a* is disposed in approximately the same phase as the elastic lever portion 117*b* in the rotation direction of the driving shaft 119. In other words, in addition to the elastic lever portion 117*a* (first flexible portion) and the elastic lever portion 117*b* (second flexible portion), Embodiment 3 includes the elastic lever portion 217*a* (third flexible portion). In the casing 211 of Embodiment 3, the portions facing the damper members 117 and 217 are configured to be on the same plane. In other words, a first contacted portion 211*a* with which the elastic lever portions 117*a* and 117*b* contact, and a second contacted portion 211*b* with which the elastic lever portion 217*a* contacts, are formed on a same plane of the casing 211.

As illustrated in FIGS. 18A and 18B, in this configuration, the elastic lever portion 117*b* of the damper member 117 and the elastic lever portion 217*a* of the damper member 217 contact with the casing 211, and elastically deform in the transition from the full separation mode to the monochrome mode. At this time, the elastic lever portion 117*b* contacts with a first contacted portion 211*a* of the casing 211, and the elastic lever portion 217*a* contacts with a second contacted portion 211*b* of the casing 211. In the transition from the monochrome mode to the full color mode, neither the damper member 117 nor 217 contacts with the casing 211, and neither elastically deform. In the transition from the full color mode to the full separation mode, only the elastic lever portion 217*a* of the damper member 117 contacts with the first contacted portion 211*a*, and elastically deforms. In other words, the braking force applied to the driving shaft 119 by the damper members 117 and 217 is strongest in the transition to the monochrome mode and the second strongest in the transition to the full separation mode, and is not generated in the transition to the full color mode. By disposing a plurality of damper members like this, the effect of reducing the collision sound in switching each mode can be changed, and an excessive increase in the driving torque can be prevented. Furthermore, the plurality of elastic lever portions can be elastically deformed simultaneously, hence the collision sound can be reduced considerably.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-082214, filed on May 19, 2022, which is hereby incorporated by reference herein in its entirety.

What is claimed is:

1. An image forming apparatus comprising:

an image bearing member configured to carry a toner image;

a belt that is endless and onto which the toner image carried on the image bearing member is to be transferred;

a contact member that is disposed to be contactable with/separable from the belt;

a rotation shaft member;

a cam configured to rotate in tandem with the rotation shaft member and to contact or separate the contact member with/from the belt;

an opposing member that is disposed to face the rotation shaft member in a direction intersecting with a shaft direction of the rotation shaft member; and a damper member that includes a first flexible portion and a second flexible portion that are elastically deformable by contacting with the opposing member, wherein, in either contact operation or separation operation of the contact member to/from the belt, the damper member rotates in tandem with rotation of the rotation shaft member so that both the first flexible portion and the second flexible portion contact with the opposing member and are elastically deformed.

2. The image forming apparatus according to claim 1, wherein the first flexible portion and the second flexible portion extend from an end that is fixed to the rotation shaft member to an other end that is a free end with respect to the direction intersecting with the shaft direction of the rotation shaft member.

3. The image forming apparatus according to claim 1, wherein the first flexible portion and the second flexible portion are disposed with a gap with respect to the opposing member both in a case where the contact operation of the contact member with the belt is completed and in a case where the separation operation of the contact member with the belt is completed.

4. The image forming apparatus according to claim 1, further comprising:

a support member that includes a regulated portion and configured to support the contact member and to be movable to a contact position at which the contact member is contacted with the belt and a separation position at which the contact member is separated from the belt;

a first energizing member configured to energize the support member in a direction in which the support member is positioned at the contact position; and a slide member that includes a regulating portion that is contactable with the regulated portion and a cam force receiving portion that is slide-contactable with the cam in rotation, wherein the slide member is configured so as to be slidable in a direction intersecting with a moving direction of the support member in a case where a contact state between the cam and the cam force receiving portion is changed by a rotation of the cam, and wherein the slide member further is configured to be movable to an operation position at which the regulating portion contacts with the regulated portion whereby the support member is located at the separation position resisting an energizing force of the first energizing member, and a non-operation position at which the regulating portion does not contact with the regulated portion; and a second energizing member configured to energize the slide member in a direction of maintaining the contact state between the cam and the cam force receiving portion.

5. The image forming apparatus according to claim 4, wherein the slide member is movable in a first direction to move from the operation position to the non-operation position, and in a second direction to move from the non-operation position to the operation position, and wherein the first energizing member is configured to energize the support member in a direction intersecting with the first direction, and the second energizing member is configured to energize the slide member in the second direction.

6. The image forming apparatus according to claim 5, wherein the opposing member is a casing configured to support the slide member and the support member.

7. The image forming apparatus according to claim 1, further comprising a plurality of contact members that include a first contact member and a second contact member, wherein the image forming apparatus has modes including a first mode in which the first contact member and the second contact member are separated from the belt, a second mode in which the first contact member is contacted with the belt and the second contact member is separated from the belt, and a third mode in which the first contact member and the second contact member are contacted with the belt, wherein the image forming apparatus is configured to switch the modes in the sequence of: the first mode, the second mode, the third mode and the first mode, and wherein, in the contact operation of the first contact member, both the first flexible portion and the second flexible portion elastically deform.

8. The image forming apparatus according to claim 7, wherein the first flexible portion is disposed at a position that is approximately the same as a position of the second flexible portion in the shaft direction of the rotation shaft member, and is disposed in a phase that is different from a phase of the second flexible portion in a rotation direction of the rotation shaft member, wherein the opposing member includes a first contacted portion with which the first flexible portion contacts, and a second contacted portion with which the second flexible portion contacts, in the contact operation of the first contact member, and wherein the first contacted portion and the second contacted portion form a depressed portion which depresses in a direction away from the rotation shaft member.

9. The image forming apparatus according to claim 8, wherein, in the contact operation of the second contact member, the second flexible portion is elastically deformed by contacting with the first contacted portion, and wherein, in the separation operation of the first contact member and the second contact member, the first flexible portion is elastically deformed by contacting with the second contacted portion.

10. The image forming apparatus according to claim 8, wherein the opposing member further includes a third contacted portion, wherein, in the contact operation of the second contact member, the first flexible portion is elastically deformed by contacting with the third contacted portion, and the second flexible portion is elastically deformed by contacting with the first contacted portion, and wherein in the separation operation of the first contact member and the second contact member, the first flexible portion is elastically deformed by contacting with the second contacted portion, and the second flexible portion is elastically deformed by contacting with the third contacted portion.

11. The image forming apparatus according to claim 7, wherein the first flexible portion is disposed at a position that is different from as a position of the second flexible portion in the shaft direction of the rotation shaft member, and is disposed in a phase that is approximately the same a phase of the second flexible portion in a rotation direction of the rotation shaft member, wherein the opposing member includes a first contacted portion with which the first flexible portion contacts, and a second contacted portion with which the second flexible portion contacts, in the contact operation of the first contact member, and wherein the first contacted portion and the second contacted portion are formed on the same plane.

12. The image forming apparatus according to claim 11, wherein the damper member further includes a third flexible portion, wherein, in the contact operation of the second contact member, none of the first flexible portion, the second flexible portion and the third flexible portion contact the first contacted portion nor the second contacted portion, and wherein, in the separation operation of the first contact member and the second contact member, the third flexible portion is elastically deformed by contacting with the first contacted portion.

13. The image forming apparatus according to claim 1, wherein the first flexible portion and the second flexible portion are formed of a plastic material or a metal material.

* * * * *